US011045807B2

(12) United States Patent
Meldrum et al.

(10) Patent No.: US 11,045,807 B2
(45) Date of Patent: Jun. 29, 2021

(54) INTEGRATED PLATFORM FOR CHARACTERIZATION OF SINGLE CELLS OR SMALL CELL CLUSTERS

(71) Applicants: Deirdre Meldrum, Phoenix, AZ (US); Laimonas Kelbauskas, Gilbert, AZ (US); Yanqing Tian, Tempe, AZ (US); Honor Glenn, Mesa, AZ (US); Clifford Anderson, Tempe, AZ (US); Kristen Lee, Mesa, AZ (US); Ganquan Song, Mesa, AZ (US); Liqiang Zhang, Chandler, AZ (US); Jeff Houkal, Los Angeles, CA (US); Fengyu Su, Tempe, AZ (US); Benjamin Ueberroth, Scottsdale, AZ (US); Jacob Messner, Scottsdale, AZ (US); Hong Wang, Scottsdale, AZ (US); Kimberly Bussey, Scottsdale, AZ (US)

(72) Inventors: Deirdre Meldrum, Phoenix, AZ (US); Laimonas Kelbauskas, Gilbert, AZ (US); Yanqing Tian, Tempe, AZ (US); Honor Glenn, Mesa, AZ (US); Clifford Anderson, Tempe, AZ (US); Kristen Lee, Mesa, AZ (US); Ganquan Song, Mesa, AZ (US); Liqiang Zhang, Chandler, AZ (US); Jeff Houkal, Los Angeles, CA (US); Fengyu Su, Tempe, AZ (US); Benjamin Ueberroth, Scottsdale, AZ (US); Jacob Messner, Scottsdale, AZ (US); Hong Wang, Scottsdale, AZ (US); Kimberly Bussey, Scottsdale, AZ (US)

(73) Assignee: ARIZONA BOARD OF REGENTS ON BEHALF OF ARIZONA STATE UNIVERSITY, Scottsdale, AZ (US)

( * ) Notice: Subject to any disclaimer, the term of this patent is extended or adjusted under 35 U.S.C. 154(b) by 0 days.

(21) Appl. No.: 16/479,729

(22) PCT Filed: Feb. 26, 2018

(86) PCT No.: PCT/US2018/019738
§ 371 (c)(1),
(2) Date: Jul. 22, 2019

(87) PCT Pub. No.: WO2018/157064
PCT Pub. Date: Aug. 30, 2018

(65) Prior Publication Data
US 2020/0406253 A1    Dec. 31, 2020

Related U.S. Application Data

(60) Provisional application No. 62/464,125, filed on Feb. 27, 2017.

(51) Int. Cl.
*B01L 3/00* (2006.01)
*G01N 15/14* (2006.01)
(Continued)

(52) U.S. Cl.
CPC ....... *B01L 3/50851* (2013.01); *B01L 3/50853* (2013.01); *G01N 15/1484* (2013.01);
(Continued)

(58) Field of Classification Search
CPC .............. G01N 2015/1006; B01L 9/52; B01L 2300/0822; B01L 3/50851; B01L 3/50853; G02B 21/34
See application file for complete search history.

(56) References Cited

U.S. PATENT DOCUMENTS

| 570,096 A | 10/1896 | Hicock |
| 4,039,247 A | 8/1977 | Lawman et al. |

(Continued)

FOREIGN PATENT DOCUMENTS

| WO | 2010022391 A9 | 2/2010 |
| WO | 2010062654 A2 | 6/2010 |

(Continued)

OTHER PUBLICATIONS

Almendro, V., et al. Cellular heterogeneity and molecular evolution in cancer. Annu Rev Pathol 8, 277-302 (2013).
(Continued)

*Primary Examiner* — Jill A Warden
*Assistant Examiner* — Dwayne K Handy
(74) *Attorney, Agent, or Firm* — Yakov Sidorin; Quarles & Brady LLP

(57) ABSTRACT

An integrated technological platform enabling real-time quantitative multiparameter metabolic profiling, utilizing
(Continued)

either or both of extra and intracellular optical sensors, individually or simultaneously. A scalable embedded micropocket array structure, generally fabricated on fused silica substrates, facilitates the integration of multiple, spatially separated extracellular sensors for multiparameter analysis in a container formed with the use of an activation mechanism forming part of a device configured to hold the container during the measurements. The creation of hermetically sealed microchambers is carried out with a pneumatically and/or mechanically and/or electromechanically driven device that is "floating" within the holding device and that is optionally equipped with a vacuum/suction mechanism to hold a component of the container at its surface.

4 Claims, 14 Drawing Sheets

(51) Int. Cl.
G02B 21/34 (2006.01)
G01N 15/10 (2006.01)

(52) U.S. Cl.
CPC ...... *G02B 21/34* (2013.01); *B01L 2200/0668* (2013.01); *B01L 2300/046* (2013.01); *B01L 2300/0636* (2013.01); *B01L 2300/0822* (2013.01); *B01L 2400/0475* (2013.01); *G01N 2015/1006* (2013.01)

(56) References Cited

U.S. PATENT DOCUMENTS

| | | | |
|---|---|---|---|
| 4,508,435 | A | 4/1985 | Graham et al. |
| 5,222,429 | A | 6/1993 | Bitar |
| 5,958,760 | A * | 9/1999 | Freeman .......... B01L 7/52 356/398 |
| 8,748,192 | B2 | 6/2014 | Tian |
| 9,181,375 | B2 | 11/2015 | Tian |
| 9,410,970 | B2 | 8/2016 | Tian |
| 9,597,026 | B2 | 3/2017 | Meldrum |
| 10,022,718 | B2 | 7/2018 | Martineau |
| 10,156,573 | B2 | 12/2018 | Tian |
| 10,162,162 | B2 | 12/2018 | Wang |
| 10,221,443 | B2 | 3/2019 | Meldrum |
| 10,260,090 | B2 | 4/2019 | Martineau |
| 10,391,485 | B2 | 8/2019 | Meldrum |
| 2004/0253821 | A1 | 12/2004 | Howitz et al. |
| 2007/0009389 | A1 | 1/2007 | Seppo et al. |
| 2008/0179518 | A1 | 7/2008 | Creemer et al. |
| 2012/0201723 | A1 | 8/2012 | Loeffler et al. |
| 2012/0231533 | A1 | 9/2012 | Holl |
| 2012/0301913 | A1 | 11/2012 | Youngbull |
| 2015/0253333 | A1 | 9/2015 | Tian |
| 2016/0130651 | A1 | 5/2016 | Lehto et al. |
| 2016/0202247 | A1 | 7/2016 | Tian |
| 2016/0215254 | A1 | 7/2016 | Meldrum |
| 2018/0264468 | A1 | 9/2018 | Anderson |
| 2018/0318835 | A1 | 11/2018 | Martineau |
| 2018/0334700 | A1 | 11/2018 | Messner |
| 2019/0126275 | A1 | 5/2019 | Kelbauskas |
| 2019/0153005 | A1 | 5/2019 | Kong |
| 2019/0177784 | A1 | 6/2019 | Martineau |

FOREIGN PATENT DOCUMENTS

| | | |
|---|---|---|
| WO | 2012112440 A2 | 8/2012 |
| WO | 2015048009 A1 | 4/2015 |
| WO | 2017049122 A1 | 3/2017 |
| WO | 2017062807 A1 | 4/2017 |
| WO | 2017083817 A1 | 5/2017 |
| WO | 2017087473 A1 | 5/2017 |
| WO | 2017151978 A1 | 9/2017 |
| WO | 2017184998 A1 | 10/2017 |
| WO | 2018013948 A1 | 1/2018 |
| WO | 2018027236 A1 | 2/2018 |
| WO | 2018027238 A1 | 2/2018 |
| WO | 2018136794 A1 | 7/2018 |
| WO | 2018160998 A1 | 9/2018 |
| WO | 2018213269 A1 | 11/2018 |
| WO | 2019046452 A1 | 3/2019 |

OTHER PUBLICATIONS

Amir, E. D. et al. viSNE enables visualization of high dimensional single-cell data and reveals phenotypic heterogeneity of leukemia. Nat. Biotechnol. 31, 545-552 (2013).
Angermueller, C. et al. Parallel single-cell sequencing links transcriptional and epigenetic heterogeneity. Nat. Methods 13, 229-232 (2016).
Anis Y, et al (2011) Diaphragm pico-liter pump for single-cell manipulation. Biomed Microdevices 13: 651-659.
Bader, E et al. Identification of proliferative and mature beta-cells in the islets of Langerhans. Nature 535, 430-434 (2016).
Bedard, P. L., et al. Tumour heterogeneity in the clinic. Nature 501, 355-364 (2013).
Benedicto I, et al. (2012) Role of tight junctions in hepatitis C virus infection. Rev Esp Enferm Dig 104: 255-263.
Blatter, S. et al. Minimal residual disease in cancer therapy—Small things make all the difference. Drug Resist Updat 21-22, 1-10 (2015).
Boushel R, et al (2012) Opposing effects of nitric oxide and prostaglandin inhibition on muscle mitochondrial Vo(2) during exercise. Am J Physiol Regul Integr Comp Physiol 303: R94-100.
Burgess, Lloyd W. "Oxygen Sensor Developments for Real-time Monitoring of Single Cells in Restricted Volumes" Presentation, CPAC SI, 2010.
Chacko, B. K. et al. The Bioenergetic Health Index: a new concept in mitochondrial translational research. Clin Sci (Lond) 127, 367-373 (2014).
Chen CS, et al (1997) Geometric control of cell life and death. Science 276: 1425-1428.
Clark SM, et al. High-efficiency microarray printer using fused-silica capillary tube printing pins. Anal Chem. 2008;80 (19):7639-42. doi: Doi 10.1021/Ac8010395. PubMed PMID: WOS:000259603100064.
Clever, D. et al. Oxygen Sensing by T Cells Establishes an Immunologically Tolerant Metastatic Niche. Cell 166, 1117-1131 e1114 (2016).
Deberardinis, R. J. et al. Fundamentals of cancer metabolism. Sci Adv 2, e1600200 (2016).
Dennison, J. B. et al. Lactate dehydrogenase B: a metabolic marker of response to neoadjuvant chemotherapy in breast cancer. Clin Cancer Res 19, 3703-3713 (2013).
Dey, S. S., et al. Integrated genome and transcriptome sequencing of the same cell. Nat. Biotechnol 33, 285-289 (2015).
Ding, Y. et al. Receptor tyrosine kinase ErbB2 translocates into mitochondria and regulates cellular metabolism. Nat Commun 3, 1271 (2012).
Dragavon, J. et al. A cellular isolation system for real-time single-cell oxygen consumption monitoring. J R Soc Interface 5 Suppl 2, S151-159 (2008).
Duarte, F. V., et al. Regulation of Mitochondrial Function and its Impact in Metabolic Stress. Curr Med Chem 22, 2468-2479 (2015).
Eirew, P. et al. Dynamics of genomic clones in breast cancer patient xenografts at single-cell resolution. Nature 518, 422-426 (2015).
Eldar, A. et al. Functional roles for noise in genetic circuits. Nature 467, 167-173 (2010).
Enriquez-Navas, P. M., et al. Application of Evolutionary Principles to Cancer Therapy. Cancer Res. 75, 4675-4680 (2015).
Estrella, V. et al. Acidity generated by the tumor microenvironment drives local invasion. Cancer Res 73, 1524-1535 (2013).
Fasano A (2012) Zonulin, regulation of tight junctions, and autoimmune diseases. Ann N Y Acad Sci 1258: 25-33.

(56) References Cited

OTHER PUBLICATIONS

Frantseva MV, et al. (2002) Specific gap junctions enhance the neuronal vulnerability to brain traumatic injury. J Neurosci 22: 644-653.
Garcia-Escudero, V., et al. Deconstructing mitochondrial dysfunction in Alzheimer disease. Oxid Med Cell Longev 2013, 162152 (2013).
Gatenby RA, et al (2003) The glycolytic phenotype in carcinogenesis and tumor invasion: Insights through mathematical models. Cancer Research 63: 3847-3854.
Gatenby RA, et al (2004) Why do cancers have high aerobic glycolysis? Nature Reviews Cancer 4: 891-899.
Gentric, G., et al. Heterogeneity in Cancer Metabolism: New Concepts in an Old Field. Antioxid Redox Signal (2016).
Greaves, M. et al. Clonal evolution in cancer. Nature 481, 306-313 (2012).
Gross, A. et al. Single-cell printer: automated, on demand, and label free. J Lab Autom 18, 504-518 (2013).
Grun, D. et al. Single-cell messenger RNA sequencing reveals rare intestinal cell types. Nature 525, 251-255 (2015).
Guo, G. et al. Resolution of cell fate decisions revealed by single-cell gene expression analysis from zygote to blastocyst. Dev. Cell 18, 675-685 (2010).
Hanahan D, et al (2011) Hallmarks of cancer: the next generation. Cell 144: 646-674.
Heath, J. R., et al. Single-cell analysis tools for drug discovery and development. Nat Rev Drug Discov (2015).
Hensley, C. T. et al. Metabolic Heterogeneity in Human Lung Tumors. Cell 164, 681-694 (2016).
Heppner, G. H. Tumor heterogeneity. Cancer Res 44, 2259-2265 (1984).
Hou, Y. et al. Single-cell triple omics sequencing reveals genetic, epigenetic, and transcriptomic heterogeneity in hepatocellular carcinomas. Cell Res. 26, 304-319 (2016).
Hyun, B. R., et al. Single molecule and single cell epigenomics. Methods 72, 41-50 (2015).
International Searching Authority, Search Report and Written Opinion for application PCT/US2018/019738, dated May 17, 2018.
Jacotot E, et al. (2001) Control of mitochondrial membrane permeabilization by adenine nucleotide translocator interacting with HIV-1 viral protein R and Bcl-2. Journal of Experimental Medicine 193: 509-519.
Jaitin, D. A. et al. Massively parallel single-cell RNA-seq for marker-free decomposition of tissues into cell types. Science 343, 776-779 (2014).
Jantzen K, et al. (2012) Oxidative damage to DNA by diesel exhaust particle exposure in co-cultures of human lung epithelial cells and macrophages. Mutagenesis 27: 693-701.
Junker, J. P. et al. Every cell is special: genome-wide studies add a new dimension to single-cell biology. Cell 157, 8-11 (2014).
Junker, J. P. et al. Single-cell transcriptomics enters the age of mass production. Mol. Cell 58, 563-564 (2015).
Kangwan, N., et al. Chemoquiescence for ideal cancer treatment and prevention: where are we now? J Cancer Prev 19, 89-86 (2014).
Kelbauskas, L. et al, "Platform for combined analysis of functional and biomolecular phenotypes of the same cell," Scientific Reports, vol. 7, article No. 44636, Mar. 16, 2017.
Kelbauskas, L. et al. Method for physiologic phenotype characterization at the single-cell level in non-interacting and interacting cells. J Biomed Opt 17, 037008 (2012).
Kim, Ki-Tae. "Analysis of pressures generated in a piston-cylinder type apparatus." Journal of Geophysical Research 79.23 (1974): 3325-3333.
Tian, Y., et al. A New Crosslinkable Oxygen Senso Covalently Bonded into Poly(2-hydroxyethyl methacrylate)-CO-Polyacrylamide Thin Film for Dissolved Oxygen Sensing. Chem Mater 22, 2069-2078 (2010).
Turcotte ML, et al (2002) Variation in mitochondrial function in hypoxia-sensitive and hypoxia-tolerant human glioma cells. British Journal of Cancer 86: 619-624.
Van Der Maaten, L. et al. Visualizing Data using t-SNE. J. Mack Learn. Res. 9, 2579-2605 (2008).
Van Norstrand DW, et al. (2012) Connexin43 mutation causes heterogeneous gap junction loss and sudden infant death. Circulation 125: 474-481.
Warburg O. On the origin of cancer cells. Science. 1956;123(3191):309-14. PubMed PMID: 13298683.
Warfel, N. A. et al. HIF-1 signaling in drug resistance to chemotherapy. Curr. Med. Chem. 21, 3021-3028 (2014).
Will, Y., et al. Analysis of mitochondrial function using phosphorescent oxygen-sensitive probes. Nat Protoc 1, 2563-2572 (2006).
Xu, T., et al. Inkjet printing of viable mammalian cells. Biomaterials 26, 93-99 (2005).
Xue, M. et al. Chemical methods for the simultaneous quantitation of metabolites and proteins from single cells. J. Am. Chem. Soc. 137, 4066-4069 (2015).
Yang J, et al (2008) Reactive oxygen species and nitric oxide regulate mitochondria-dependent apoptosis and autophagy in evodiamine-treated human cervix carcinoma HeLa cells. Free Radical Research 42: 492-504.
Zahraoui A (2004) [Tight junctions, a platform regulating cell proliferation and polarity]. Med Sci (Paris) 20: 580-585. With Summary in English on p. 6.
Zarowna-Dabrowska, A., et al. "Generation of primary hepatocyte microarrays by piezoelectric printing." Colloids and Surfaces B: Biointerfaces 89 (2012): 126-132.
Zeng, J. et al. A minimally invasive method for retrieving single adherent cells of different types from cultures. Sci. Rep. 4, 5424 (2014).
Zeng, W., et al. Hypoxia and hypoxia inducible factors in tumor metabolism. Cancer Left. 356, 263-267 (2015).
Zhang, L. et al. A dual sensor for real-time monitoring of glucose and oxygen. Biomaterials 34, 9779-9788 (2013).
Zhang, L. et al. A polymer-based ratiometric intracellular glucose sensor. Chem Commun (Camb) 50, 6920-6922 (2014).
Zhao, M. et al. Hypoxia-induced cell sternness leads to drug resistance and poor prognosis in lung adenocarcinoma. Lung Cancer 87, 98-106 (2015).
Zhu HX, et al. Characterization of deep wet etching of fused silica glass for single cell and optical sensor deposition. J Micromech Microeng. 2009;19(6). PubMed PMID: ISI:000266287200013.
Zhu, H. X. et al. Micro-patterning and characterization of PHEMA-co-PAM-based optical chemical sensors for lab-on-a-chip applications. Sensor Actuat B-Chem 173, 817-823 (2012).
Zhu, Haixin, et al. "High throughput micropatterning of optical oxygen sensor for single cell analysis." IEEE sensors journal 12.6 (2011): 1668-1672.
Zong, C., et al. Genome-wide detection of single-nucleotide and copy-number variations of a single human cell. Science 338, 1622-1626 (2012).
Kirschner N, et al (2012) Tight junctions and differentiation—a chicken or the egg question? Exp Dermatol 21: 171-175.
Lee, J. H. et al. Highly multiplexed subcellular RNA sequencing in situ. Science 343, 1360 1363 (2014).
Li, X. et al. Temporal and spatial evolution of somatic chromosomal alterations: a case-cohort study of Barrett's esophagus. Cancer Prev. Res. (Phila) 7, 114-127 (2014).
Lidstrom ME, et al (2003) Life-on-a-chip. Nat Rev Microbiol 1: 158-164.
Liotta LA, et al (1976) The significance of hematogenous tumor cell clumps in the metastatic process. Cancer Res 36: 889-894.
Losick, R. et al. Stochasticity and cell fate. Science 320, 65-68 (2008).
Lu, H. et al. New ratiometric optical oxygen and pH dual sensors with three emission colors for measuring photosynthetic activity in Cyanobacteria. J. Mater. Chem. 2011, 19293-192301 (2011).
Lu, Y. et al. Highly multiplexed profiling of single-cell effector functions reveals deep functional heterogeneity in response to pathogenic ligands. Proc. Natl. Acad. Sci. USA 112, E607-615 (2015).
Lunt, S. J., et al. The tumor microenvironment and metastatic disease. Clin. Exp. Metastasis 26, 19-34 (2009).

(56) References Cited

OTHER PUBLICATIONS

Macaulay, I. C. et al. G&T-seq: parallel sequencing of single-cell genomes and transcriptomes. Nat. Methods 12, 519-522 (2015).
Maley, C. C. et al. Genetic clonal diversity predicts progression to esophageal adenocarcinoma. Nat. Genet. 38, 468-473 (2006).
Martin TA, et al (2011) Tight junctions in cancer metastasis. Front Biosci 16: 898-936.
Martinez AD, et al (2009) Gap-junction channels dysfunction in deafness and hearing loss. Antioxid Redox Signal 11: 309-322.
Marusyk, A., et al. Intra-tumour heterogeneity: a looking glass for cancer? Nat. Rev. Cancer 12, 323-334 (2012).
Mendelsohn AD, et al (2010) Patterning of mono- and multilayered pancreatic beta-cell clusters. Langmuir 26: 9943-9949.
Merza SA, et al. Microfluidic Device for Transport and Observation of Single Cells. ASME. ASME International Mechanical Engineering Congress and Exposition, vol. 9: Heat Transfer, Fluid Flows, and Thermal Systems, Parts A, B and C:2213-2220. doi:10.1115/IMECE2009-13019.
Microfab Technologies, Inc. "Microdispensing" accessed online at (http://www.microfab.com/biomedical/microdispensing). 2013.
Molnar B, et al (2001) Circulating tumor cell clusters in the peripheral blood of colorectal cancer patients. Clin Cancer Res 7: 4080-4085.
Molter, T. W. et al. A microwell array device capable of measuring single-cell oxygen consumption rates. Sens Actuators B Chem 135, 678-686 (2009).
Molter, T. W. et al. A New Approach for Measuring Single-Cell Oxygen Consumption Rates. IEEE Trans Autom Sci Eng 5, 32-42 (2008).
Montcourrier P, et al (1997) Breast cancer cells have a high capacity to acidify extracellular milieu by a dual mechanism. Clinical & Experimental Metastasis 15: 382-392.
Moon, H. E. et al. Mitochondrial Dysfunction in Parkinson's Disease. Exp Neurobiol 24, 103-116 (2015).
Moser, Isabella, et al. "Pre-calibrated biosensors for single-use applications." Chemie Ingenieur Technik 85.1-2 (2013):172-178.
Mrksich M, et al (1997) Using microcontact printing to pattern the attachment of mammalian cells to self-assembled monolayers of alkanethiolates on transparent films of gold and silver. Experimental Cell Research 235: 305-313.
Munkholm C, et al (1990) Intramolecular Fluorescence Self-Quenching of Fluoresceinamine. Journal of the American Chemical Society 112: 2608-2612.
Ostuni, E., et al. Patterning mammalian cells using elastomeric membranes. Langmuir 16, 7811-7819 (2000).
Palanca-Wessels, M. C. et al. Extended lifespan of Barrett's esophagus epithelium transduced with the human telomerase catalytic subunit: a useful in vitro model. Carcinogenesis 24, 1183-1190 (2003).
Palanca-Wessels, M. C. et al. Genetic analysis of long-term Barrett's esophagus epithelial cultures exhibiting cytogenetic and ploidy abnormalities. Gastroenterology 114, 295-304 (1998).
Papp R, et al (2007) Gap junctional uncoupling plays a trigger role in the antiarrhythmic effect of ischaemic preconditioning. Cardiovasc Res 74: 396-405.
Patel, A. P. et al. Single-cell RNA-seq highlights intratumoral heterogeneity in primary glioblastoma. Science 344, 1396-1401 (2014).
Paterlini-Brechot P, et al (2007) Circulating tumor cells (CTC) detection: Clinical impact and future directions. Cancer Letters 253: 180-204.
Jeitzsch, C., et al. Hypoxia as a biomarker for radioresistant cancer stem cells. Int. J. Radiat. Biol. 90, 636-652 (2014).
Pham, T. D., et al. Microchambers with Solid-State Phosphorescent Sensor for Measuring Single Mitochondrial Respiration. Sensors (Basel) 16 (2016).
Phelan, Mary C., "Basic Techniques for Mammalian Cell Tissue Culture", Current Protocols in Cell Biology (1998) 1.1.1-1.1.10; John Wiley & Sons, Inc.
Ray, T., et al. Deep reactive ion etching of fused silica using a single-coated soft mask layer for bio-analytical applications. J Micromech Microeng 20 (2010).
Reid, B. J., et al. Barrett's oesophagus and oesophageal adenocarcinoma: time for a new synthesis. Nat. Rev. Cancer 10, 87-101 (2010).
Samanta, D., et al. Hypoxia-inducible factors are required for chemotherapy resistance of breast cancer stem cells. Proc. Nat. Acad. Sci. USA 111, E5429-5438 (2014).
Sarkar, A., et al. Microfluidic probe for single-cell analysis in adherent tissue culture. Nat. Comm. 5, 3421 (2014).
Scharping, N. E. et al. The Tumor Microenvironment Represses T Cell Mitochondrial Biogenesis to Drive Intratumoral T Cell Metabolic Insufficiency and Dysfunction. Immunity 45, 374-388 (2016).
Schumann M, et al. (2012) Defective tight junctions in refractory celiac disease. Ann N Y Aced Sci 1258: 43-51.
Shen L (2012) Tight junctions on the move: molecular mechanisms for epithelial barrier regulation. Ann N Y Acad Sci 1258: 9-18.
Shi Q. et al. Single-cell proteomic chip for profiling intracellular signaling pathways in single tumor cells. Proc. Natl. Acad. Sci. USA 109, 419-424 (2012).
Simoncini, C. et al. Alzheimer's pathogenesis and its link to the mitochondrion. Oxid Med Cell Longev 2015, 803942 (2015).
Smallwood, S. A. et al. Single-cell genome-wide bisulfite sequencing for assessing epigenetic heterogeneity. Nat. Methods 11, 817-820 (2014).
Streets, A. M. et al. Microfluidic single-cell whole-transcriptome sequencing. Proc. Natl. Acad. Sci. USA 111, 1048-7053 (2014).
Tan CP, et al. (2009) Parylene peel-off arrays to probe the role of cell-cell interactions in tumour angiogenesis. Integrative Biology 1: 587-594.
Tasoglu, Savas, et al. "Bioprinting for stem cell research." Trends in biotechnology 31.1 (2013): 10-19.
The Johns Hopkins Medical Institutions the Genetic Resources Core Facility: The Cell Center, "SOP Number: 114 Trypsinization of Adherent Cells", Revised Jun. 2002.
Tian YQ, et al. (2010) Dually fluorescent sensing of pH and dissolved oxygen using a membrane made from polymerizable sensing monomers. Sensors and Actuators B-Chemical 147: 714-722.
Tian, Y. et al. A fluorescent colorimetric pH sensor and the influences of matrices on sensing performances. Sens Actuators B Chem 188, 1-10 (2013).

\* cited by examiner

FIG. 7A  OS2

Reference probe (Rhod-MA)

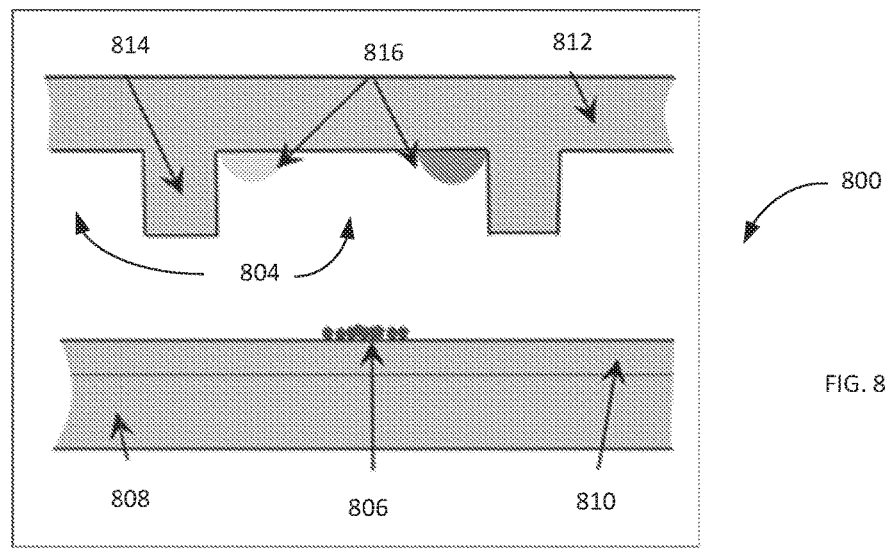
FIG. 8
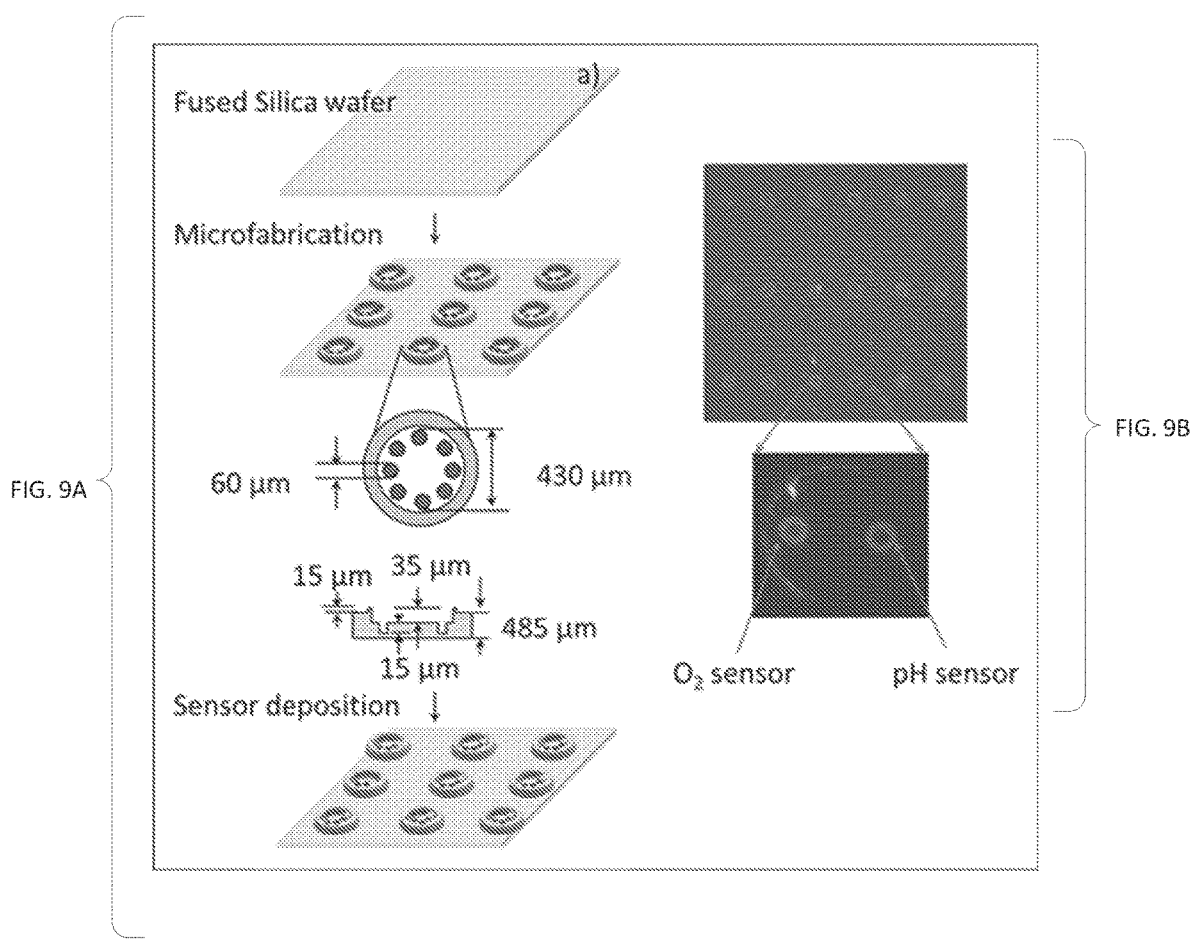
FIG. 9A
FIG. 9B

FIG. 15A
FIG. 15B
FIG. 15C
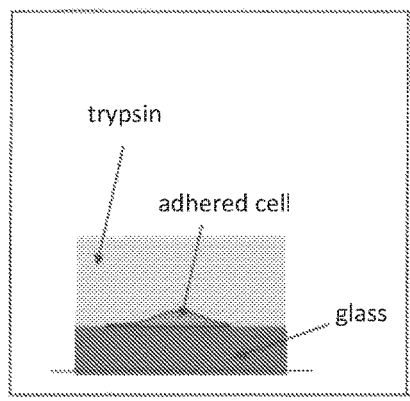
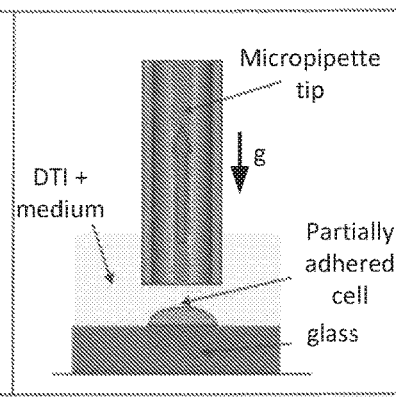
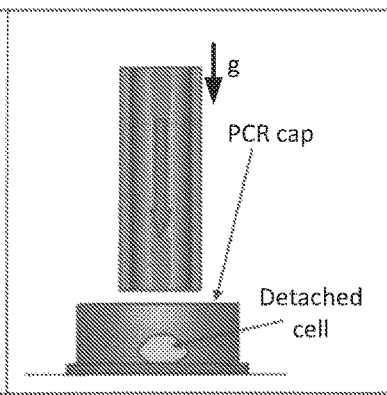
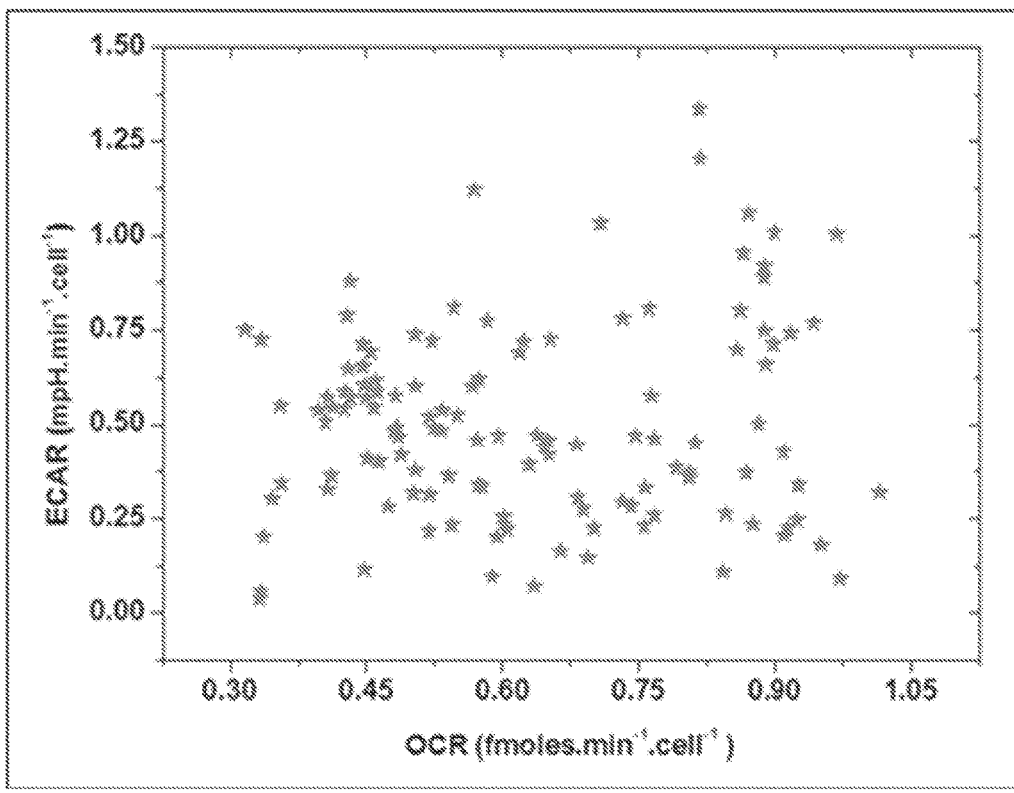
FIG. 17

INTEGRATED PLATFORM FOR CHARACTERIZATION OF SINGLE CELLS OR SMALL CELL CLUSTERS

CROSS-REFERENCE TO RELATED APPLICATIONS

This patent application is a national phase of the international patent application PCT/US2018/019738 that claims priority from and benefit of the U.S. Provisional Patent Application No. 62/464,125 filed on Feb. 27, 2017. The disclosure of each of the above-identified applications is incorporated herein by reference.

STATEMENT REGARDING FEDERALLY SPONSORED RESEARCH OR DEVELOPMENT

This invention was made with government support under U01 CA164250 and P50 HG002360 awarded by the National Institutes of Health. The government has certain rights in the invention.

TECHNICAL FIELD

The present invention generally relates to systems and methods for characterization of cells and, in particular, to a methodology for isolation and analysis of a single individual cell or a group of few cells that possesses the sensitivity necessary to perform measurements at the single cell level.

BACKGROUND

Cellular bioenergy production has long been recognized as a major contributor to pathology, most notably in cancer. Characterization of living cells and, in particular, characterization of the bioenergy production phenotype has been widely characterized at the bulk sample level. Information, obtained from bulk samples that includes mass of cells, represents ensemble averages over an entire population of cells. It is recognized, that ensemble-averaged approaches based on the use of a hundred or more of cells obscure contributions from individual cells or small subpopulations with abnormal phenotypes that may be the drivers of population survival and proliferation after treatment. Accordingly, intrinsic cellular heterogeneity in energy production profiles necessitates the development of technologies capable of resolving bioenergetic characteristics with single cell resolution.

SUMMARY

Embodiments of the invention provide a system configured to form a container for holding a live cell from first and second components and to change operational status of the container. The system includes a holding device comprising upper and lower portions, the lower portion structured to contain a trench, with a first opening throughout a bottom thereof. The system further includes a mechanism removably and repositionably integrated with the upper and lower portions and configured (i) to change the operational status by reversibly bringing together and separating from one another the first and second components when said first and second components are disposed between the upper and lower portions, and (ii) to reversibly sealingly affix said first and second components to one another to form the container with at least one fluidly-sealed chamber present therein, as a result of a reposition of the mechanism.

Embodiment also provide a method for operating such system configured to form a container for holding a live cell from first and second components and to change operational status of the container. The method includes the steps of applying a force of suction, generated outside of the system, to hold a first component against a surface of the mechanism to facilitate an alignment of the first and second components; and reversibly sealingly affix the first and second components to one another as a result of repositioning the mechanism to form the container with at least one fluidly-sealed chamber formed in the container.

BRIEF DESCRIPTION OF THE DRAWINGS

FIG. 4A: molar in open position, the sample-container components are separated. FIG. 4B: molar forced closed by pressure, the sample-container components are sealingly affixed to one another;

FIGS. 7A, 7B, and 7C illustrate optical oxygen sensor, built-in reference, and optical pH sensor used in an embodiment of the invention of FIGS. 6A-6C;

FIG. 7D—a spectrum of the sensor's emission produced in response to different levels of dissolved oxygen; FIG. 7E—a ratiometric sensor response to changes in dissolved oxygen concentration in aqueous solution; FIG. 7F—changes in sensor emission spectrum in response to varying pH; FIG. 7G—sigmoidal relative and ratiometric response of the sensor to changes in pH;

FIG. 8 is a schematic diagram of an alternative embodiment of the structural environment for containing single individual cells or small cell clusters;

FIGS. 9A, 9B: Illustration of a lid of the sample container for simultaneous monitoring of multiple analytes. FIG. 9A: process flow and lid dimensions; FIG. 9B: Fluorescence emission micrograph of a 3×3 array of lids containing the oxygen and pH sensors;

FIG. 10A: Stern-Volmer graph for oxygen sensor calibration; FIG. 10B: pH sensor calibration with Boltzmann fitting;

FIG. 11A: a process flow indicating different steps in sequence; FIG. 11B: fluorescence emission micrograph of cell clusters stained with JC-1;

FIG. 12A: Using different concentrations of oxygen and nitrogen; FIG. 12B: using buffers with different pH.

FIGS. 15A, 15B, 15C schematically illustrate cell harvesting after the measurements have been performed. FIG. 15A: the cell is trypsinized until it's partially detached from the substrate; FIG. 15B: trypsin is deactivated with defined trypsin inhibitor (DTI), the cell is aspirated into the micropipette tip. FIG. 15C: the cell is transferred into the cap of a PCR tube;

FIG. 17: analysis of OCR and ECAR data acquired during measurements of a cell sample with the embodiment of the invention.

Figure 1:
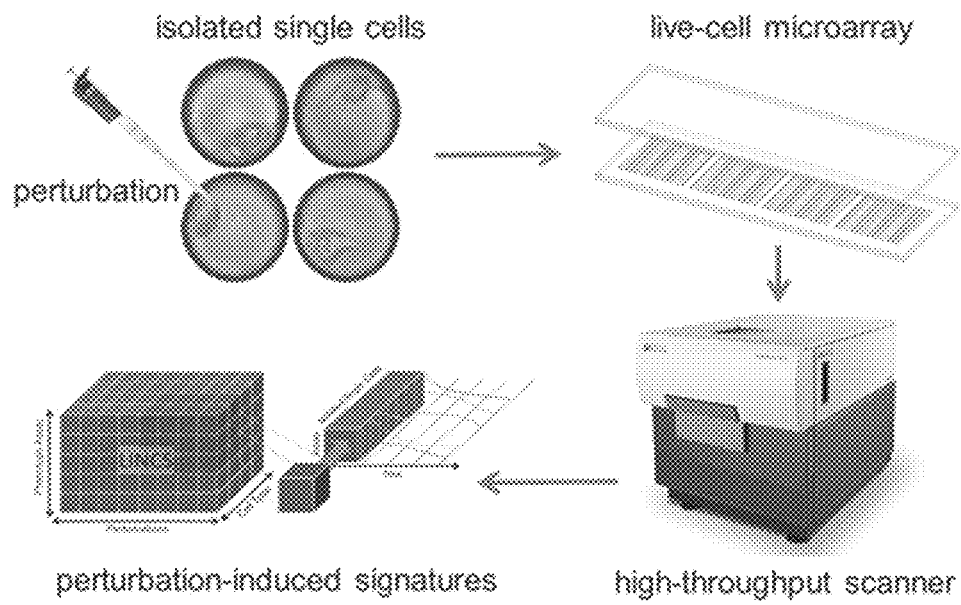
FIG. 1 schematically illustrates the concept of an integrated platform.

Generally, the sizes and relative scales of elements in Drawings may be set to be different from actual ones to appropriately facilitate simplicity, clarity, and understanding of the Drawings. For the same reason, not all elements present in one Drawing may necessarily be shown in another.

DETAILED DESCRIPTION

General

The idea of the invention is based on the realization that implementation of the simultaneous measurements of both energy metabolism (and, in particular, the oxygen consumptions rate, OCR, and extracellular acidification rate, ECAR) and intracellular functional parameters (for example, mitochondrial membrane potential, or MMP) can be effectuated under conditions that accommodate the analysis of a small cluster (<100) of interacting cells or even a single, individual cell. The measurement of the OCR and/or ECAR in such environment may be based on principles of ratiometric optical sensing. This enables a construction of an integrated measurement system that possesses the ability to characterize single, individual cells (or small clusters of fewer than a hundred interacting cells) while, at the same time, offering simultaneous analysis of cellular communication effects on the energy production phenotype. Such integrated measurement system may be alternatively referred to in this disclosure as an integrated platform or, simply, a platform.

Available commercial bio-analytical instruments that are used to explore cellular energetics are recognized in the art to require a relatively large sample size. Examples of such commercial instrumentation are provided by the "XF Analyzer" (Seahorse Biosciences, N. Billerica, Mass.), which requires a sample size on the order of $10^4$ cells, and "Oxygraph 2k" (OROBOROS Instruments, Innsbruck, Austria), which requires about $10^5$-$10^6$ cells per run. Notably, the capability of these instruments is largely limited to extracellular sensing and the ability of such instruments to analyse biological samples of limited size (for example, circulating tumor cells, or CTCs) has not been explored. Technological advances tailored towards single-cell analysis have been reported, but limited to the single-parameter measurements.

When compared to these existing methodologies configured for studying energy metabolism on a single cell level, the discussed below proposed platform represents a significant improvement for characterizing energy metabolism phenotypes in that it enables simultaneous measurements of OCR and ECAR and MMP with the single cell resolution and markedly higher throughput (in some embodiments—with a throughput of up to a thousand individual cells per assay). As such, the proposed methodology may be utilized for studying shifts in the energy balance between, for example, oxidative phosphorylation (OXPHOS) and glycolysis—a feature occurring frequently in cancer initiation and progression—in the context of cellular heterogeneity and detection of rare cells with distinctive behavior.

In general, the integrated platform comprises two major sub-systems: a tandem optical sensor circuitry for combined oxygen and pH detection, and a device configured for isolation and analysis of a single cell or few cells in hermetically sealed chambers or containers of sub-nanoliter volume. The discussed platform is equipped to create an isolated microenvironment for the cell cluster. The proposed embodiment(s) allow for the transmembrane fluxes of metabolic analytes, along with multiple intracellular parameters, to be measured simultaneously utilizing a set of custom extracellular optical sensors, and/or commercially available intracellular fluorescence stains. The technology can be used with a combination of different types of commercially available intracellular sensors, including fluorescent protein reporters, and can be readily expanded to accommodate larger numbers of extracellular sensors for other analytes of interest, for real-time characterization of the cellular function as well as underlying molecular mechanisms. This scalable container design represents a framework for next generation microfluidic devices for metabolic profiling of cells in response to stimulus at the single-cell level, the multiple-cell level, and the tissue level.

In one implementation, the measurements effectuated with the use of the proposed platform are at least in part rooted in ratiometric optical sensing of oxygen and protons in arrayed containers sealed with a hydrogel film. Oxygen concentration and pH in the arrayed microcontainers are measured in real time as alterations in the emission intensity of the corresponding thin-film extracellular sensors, embedded in the hydrogel film. Additional fluorophore may be incorporated into the hydrogel film and configured to operate as a temperature sensor and/or a reference that is not affected by the changes in oxygen concentration and pH. The microchambers are sealed, generally hermetically, with the use of the sensor film as an analyte diffusion barrier to create localized microenvironments that are isolated from the surrounding media. OCR and ECAR are assessed based on changes in the sensor emission intensity inside the microchambers as a function of time. In a related embodiment, the individual cells or small cell clusters are disposed on the judiciously prepared substrate and are covered with a lid containing micropockets equipped with extracellular sensors.

System

Embodiments of the present invention pertain to the containment of the biological sample and the apparatus surrounding the contained biological sample, and can be generally characterized as a two-portion device into which the components forming the container for the biological sample can be loaded to be subsequently clamped together to define the sample container. The so-formed container, now inside the two-portion device, is further operably coordinated with an environmentally controlled module held within a larger analysis instrument.

More specifically, and in reference to FIG. 1, embodiments of the invention provide a methodology or platform (that is, a system and associated method(s)) for secluding biological samples representing single cells of small cell clusters in sealed containers or microchambers and configured for analyzing biological processes associated with such samples. The platform enables the integration of at least:

(1) Preparation of the sample substrate (the carrier/supporter of the cell);

(2) Cell loading onto the sample substrate;

(3) Operable coordination of the sample substrate (in one example—a substrate sized to include an array of microwells) with the auxiliary element (such as, in one example—a lid with sensors, or a sensor lid) to achieve hermetic sealing the microchambers to form a sample container;

(4) Spatial alignment and fixation of the sample substrate with the auxiliary element in a judiciously-structured holding device, which is equipped for introduction of perturbagen and environmental control (including thermal control and dissolved gas control) of the sample to maintain the cell(s) in the sample in viable state. Here, the holding device is sized to secure the sample substrate and an auxiliary element in predetermined spatial coordination with one another to seal the microchambers, thereby forming a sealed sample container, and to provide repeatable actuation and de-actuation of the sealing mechanism within the context of a single, portable and self-contained unit in the microplate format. This operational capability enables close/open sequences for multiple successive or operationally-independent microchamber sealing events for multiple iterations of various measurements of metabolic and other parameters of live cells inside the sample container. The multiplicative functional re-use and re-iteration of the components of the sample container advantageously differentiates an embodiment of the invention from methodologies of related art which, as a person of ordinary skill is well aware—are not compatible with multiple measurements requiring high throughput; and (5) Operable cooperation of the holding device with the sample container in it in a standardized microplate scanner (scanner, for short), such as a scanning microscope system or other comparable detection-and-analysis system. The commercial scanner is configured to deliver light from a laser or appropriately spectrally-filtered broad-spectrum light source to the region of interest (ROI) where a sample cell resides, to collect fluorescence emitted by the cell in response to being so-irradiated, and to pass an output representing the collected fluorescence to a detection circuitry. The scope of the present invention includes the use of such commercial scanner. This prior art instrument can scan across larger areas then just one field of view giving it versatility as to the size of the substrate which can be studied.

Figure 2:
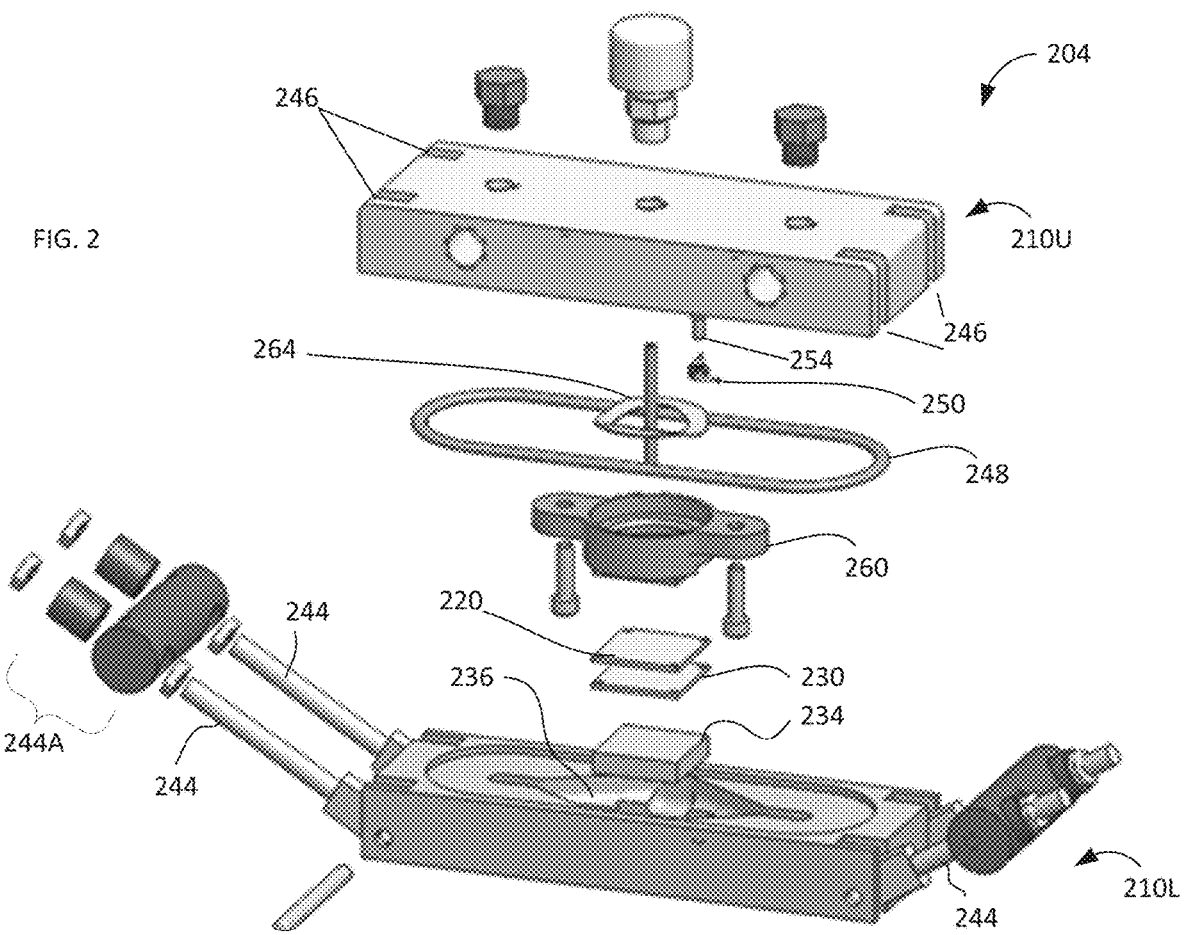
FIG. 2 is a schematic of an embodiment of an inner portion of a holding device (exploded view) structured to sealingly affix to one another, in a pre-determined spatial coordination, the sample substrate and the auxiliary element to form a hermetically-sealed sample container disposed in the holding device.
Figure 3:
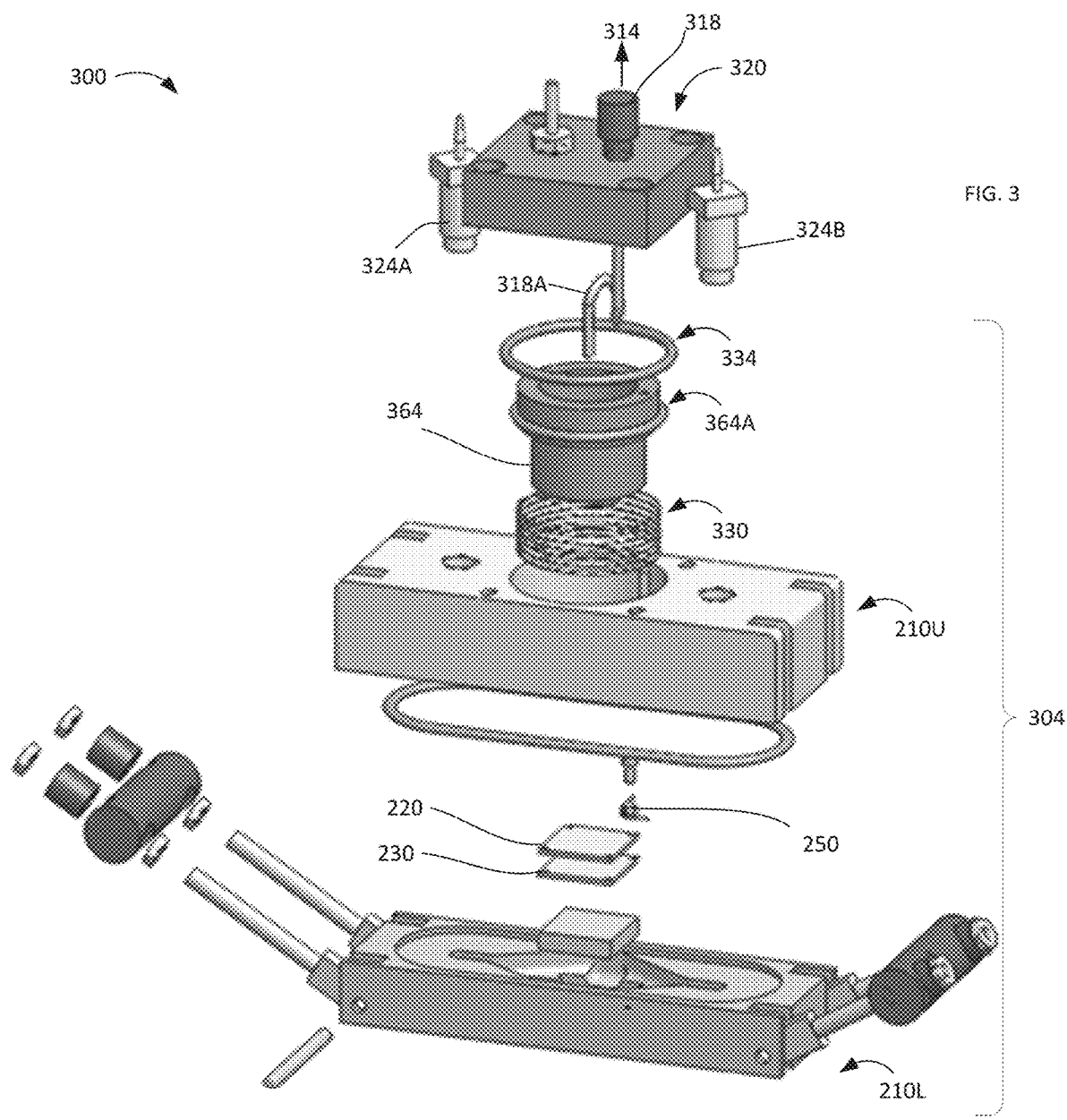
FIG. 3 is an exploded view of an overall holding device, including an alternative inner portion.

FIG. 2 illustrates an implementation of an inner portion 204 of the holding device, configured as a spring-force substrate-clamping fixture. The embodiment 204 includes two halves (or two main portions), the upper portion 210U and the lower portion 210L, which in operation are reversibly clamped together via a spring loaded latching (grab-and-hold) mechanism after the components 220, 230 of the to-be-formed sample holder (such as a sensor substrate and a microwell substrate with live cells) are disposed between the portions 210U, 210L on top of the optically-transparent plate or window 234 in an appropriately-dimensioned receiving trench or notch 236 of the portion 210L. The bottom of the trench 236 (not shown), there is a throughout opening optically connecting the space on one side of the portion 210L with the space on the other side of the portion 210L. In this example, the trench 236 is shown to be a diamond-shaped channel sized to fluidly connect (in one example—to pass fluid) from one end to another while fully encompassing at least one of the components 220, 230.

The geometrical and optical characteristics of the window 234 are judiciously chosen to enable the optical observation and registration of events occurring between the components 220, 230 through the window with the instrument located on the other side of the window. In operation, the window is placed into the trench by the user or in an automated fashion (for example, electromechanically or pneumatically, to name just a few).

As shown, the latching mechanism 240A, 240B is operably connected to the lower half 210L, and, when operated by the user, forces the upper half 210U into the lower half 210L as a result of cooperating the rods 244 (equipped with the securing handle 244) of the mechanism 240A, 240B into the grooves 246 of the upper half 210U. (It is appreciated, that in a related embodiment the orientation of the latching mechanism can be reversed to place the grooves on the portion 210L and the rods on the portion 210U.) An O-ring (or another appropriate sealing ring) 248 is located between the two halves 210U, 210L to seal the cavity that is formed therebetween and that includes the trench 236. In use, the lower component 230 is placed onto the window 234 either manually or in an automated fashion (for example, electromechanically or pneumatically, to name just a few). A spring 250, activated with the piston or protrusion 254, holds the lower component 230 while registering it within the trench 236. Also shown are examples of the molar or plunger 260 and the 3-point spring or washer 264 configured to generate molar clamping force, as the method to compress in operation the components 220, 230 together: the wave spring washer 264 applies uniform and balanced force over the area of the molar or plunger 260.

An embodiment 300 of the overall holding device, which includes the portion 200 (as shown—with molar/plunger 364 the shape of which is modified as compared to that of the molar 260 of FIG. 2). The upper half of the device houses the moving part of the device. The plunger 364 is structured as a free floating, pneumatically and/or mechanically and/or electromechanically driven device that is optionally equipped with a vacuum/suction mechanism to hold the component 220 at its surface. The required suction 314 is optionally applied through the flexible tubular element 318 in the supporting plate 320 and down through a small hole in the plunger through the tubing 318A to the lower (substrate) face level of the molar 364, against which the component 220 (such as a sensor substrate) would be placed about geometrical registry features, to thereby be secured to the plunger 310. In operation, the plunger's default state is a retracted state, causing the component 220 to be a small distance (~2 mm or so) away from the component 230. This allows for liquid or gas exchange between the two components 220, 230, arranged with the use of at least one fluid exchange port (as shown—two ports 324A, 324B).

Figure 4A:
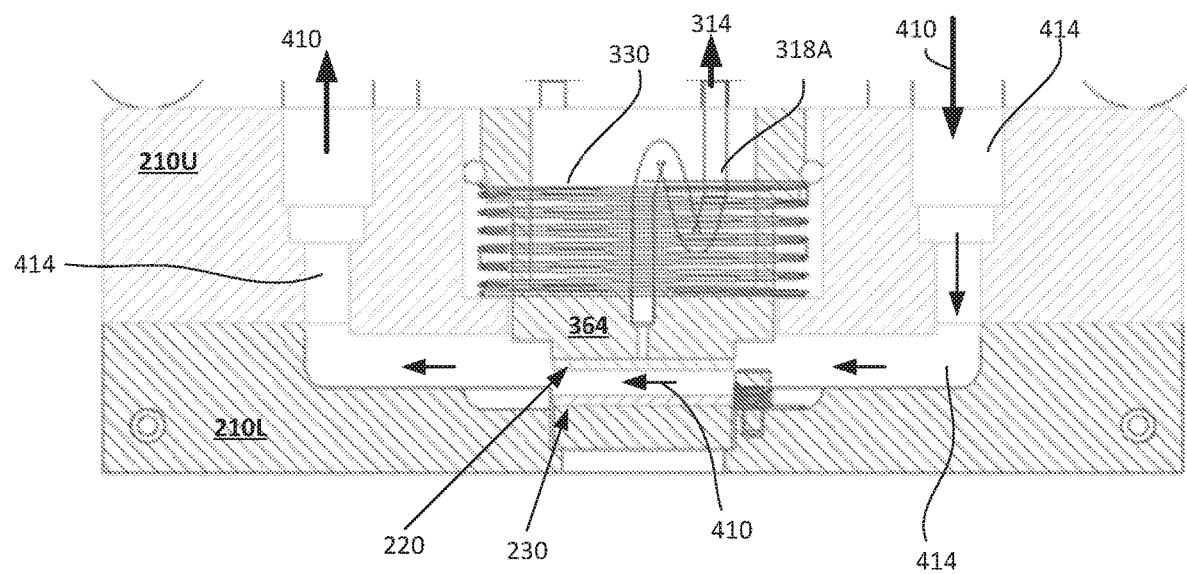
FIGS. 4A, 4B provide cross-sectional views of a portion of the holding device, showing the upper and lower portions of the device brought together with the sample-container components forming a hermetically-sealed sample container.
Figure 4B:
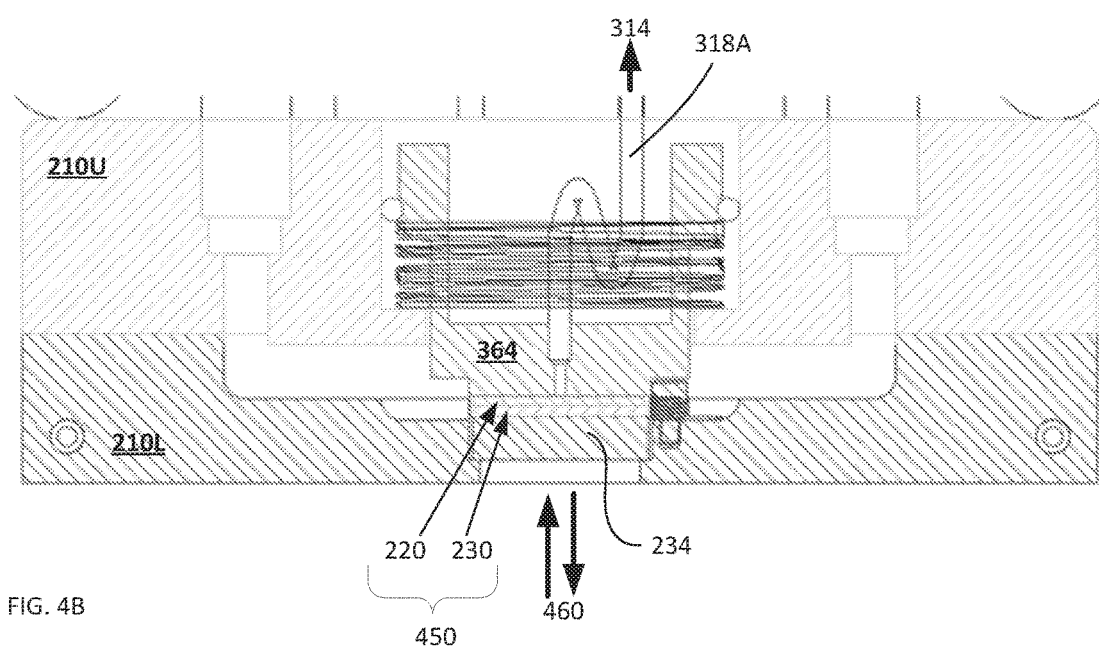

To activate, pressure is appropriately applied behind the plunger to activate the molar 364, equipped with the seal 364A and biased with the return spring 330, to bring the component 220 at the lower face of the molar 364 in contact with the component 230, as illustrated in FIG. 4A and FIG. 4B. Component 334 illustrates an auxiliary sealing element (such as an O-ring).

To complement the above discussion, FIG. 4A illustrates the situation when the upper and lower portions 210U, 210L are joined together (with the use of the latching mechanism 240A, 240B). The molar 364 is in the open position (the plunger has not been activated yet) and the suction/vacuum 314 is applied to hold the upper sample-container component 220 at the lower face of the molar 364, and holds at apart from the component 230. Fluid delivery 410, as required for proper maintenance of the sample located between the components 220, 230, is arranged through the appropriately defined fluid path 414.

As shown in FIG. 4B, molar 364 is force-closed with pressure applied to the molar through the plunger (which is now in a forward, enacted position; not shown), having brought the components 220, 230 together to form, under pressure, a hermetically-sealed (with an appropriate seal layer; not shown) sample container 450, which contains microchambers with individual cells and/or small clusters of cells therein. After the formation of the sealed, cell-including sample container 450, the flow of fluid 410 may no longer be required. In general however, and in further reference to both FIGS. 4A, 4B, liquid and/or gas 410 can be brought in one of the flow-through ports, passed between the components 220, 230 when they are separated, or around the components 220, 230 when they are sealed together into a sample container 450, and removed through a flow-through port. The advantage of the so-configured fluidic supply of the embodiment of the invention is the ability and freedom, provided to the user, to test components 220, 230 using fluids with different molecule concentrations, as well as to expose the live cells contained at or on one of the components 220, 230 to predetermined perturbagens (chemical and/or biological agents). (In FIG. 4B, the vacuum 314 is indicated to be still applied. Two arrows 460 schematically illustrate the process of optical interrogation of the sample through the window.)

Figure 5:
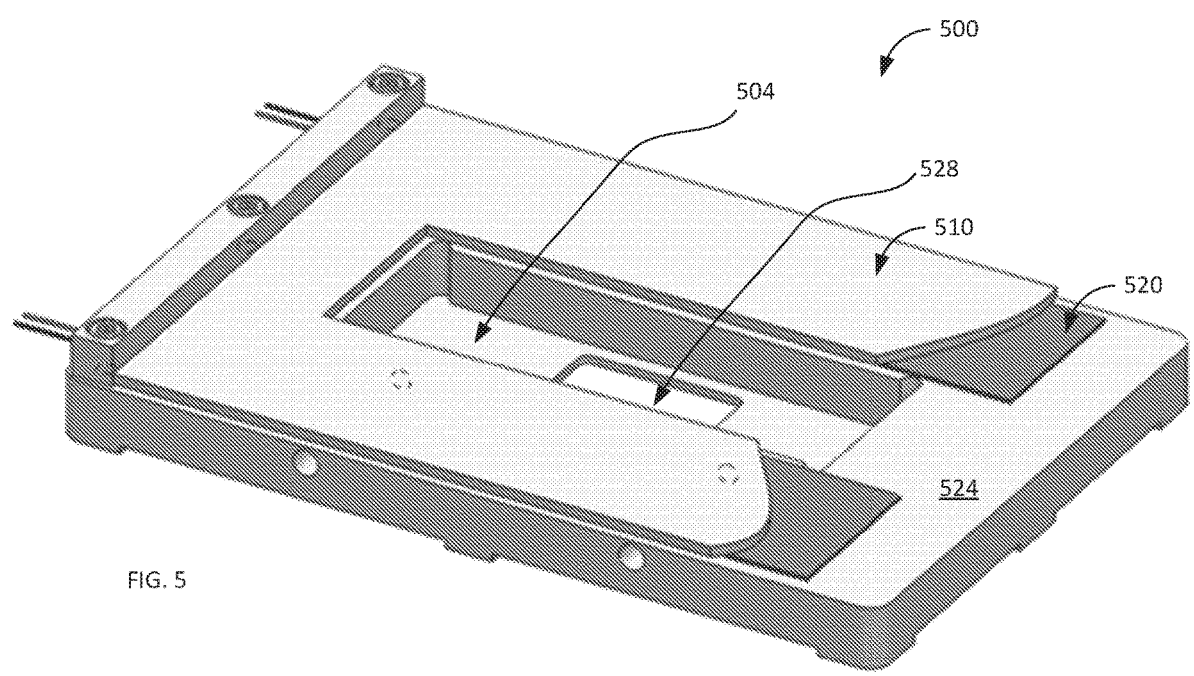
FIG. 5 is a representation of a temperature-controlled holder plate containing a cavity, sized to accommodate the overall holding device of FIG. 2 (insulation is shown cut-away to expose the heating pads)

An overall embodiment of the integrated platform preferably makes use of a temperature-controlled holder plate 500, shown in FIG. 5. The plate 500 can be dimensioned to have an outer footprint corresponding to that of the container 450 (of approx. 3"×5") or that of any microscope tray (for Nikon confocal microscopes, such footprint would be approx. 4"×6"). In other words, the embodiment of the invention take advantage of accommodating flexible dimensions of the holder plate to not limit the scope of the invention to any particular detection-and-analysis system, but give it versatility to use various outside instruments. The temperature controlled plate is made preferably of aluminum and has a cavity 504 to hold the substrate clamping device (in this case 1"×3"); it is outfitted with heating pads 510 and insulation 520 (as shown, the insulation is cut-away to expose the heating pads). The base portion 524 of the plate 500 is shaped to include, in a bottom of the cavity 504, a throughout opening or aperture 528 that, due to the appropriately chosen dimensions, is automatically aligned with the window 234 of the overall holding device to allow the irradiation of the cell sample with light from the chosen source of light (not shown) and/or collection of optical response produced by the cell sample in response to such irradiation, with an optical detector circuitry (not shown). The purpose of the temperature controlled plate 500 is to maintain a temperature controlled-environment at and within the clamping system 300, preferably about 37 degrees Celsius, to maintain the cells under test within a temperature range conducive to cell health and normal function (that is, to maintain viability of the cell sample within the container 450).

Alternative and Related Implementations and Considerations.

Any of the embodiments of inner portion 204, 304, the actuating mechanism, and the overall holding device 300 can be appropriately modified to serve instantaneous measurement needs.

(A) For example, comparing again the implementations of the inner portions 204 and 304 of the overall holding device with one another, the portion 204 does not preclude the ability to create vacuum/suction through the plunger substrate to hold the component 220 in place. While the operationally-simplified embodiment 204 may not enable the user to separate the components 220, 230 from each other while both of these components are between the latched portions 210U, 210L, the implementation 204 (as compared with that of 304) may, nevertheless, add simplicity to the assembly and testing.

(B) Alternatively or in addition, and in further reference to FIG. 2 (and in comparison with FIGS. 4A, 4B), a combination of the wave spring design and an actuating mechanism is not shown but is within the scope of the invention. In this case, the actuating mechanism is simpler in design and can be achieved as a manual compression with a latch or bracket, as an electromechanical actuator, or as a pneumatic actuator. The actuating mechanism includes a backing plate behind the wave spring 264, which actuates between preferably two specific positions—one corresponding to sealing and one corresponding to open. Both positions of the backing plate are determined by hard stops in the upper half of the device fixture.

(C) Pneumatic Coupling. Skilled artisan will readily recognize that producing hermetic and uniform seals on the micron scale over large areas of substrates with high repeatability presents a formidable challenge mainly due to the non-homogeneous distribution of the pressure applied to the surface. To enable the homogeneous force distribution across large areas of the first and second component, the pneumatic actuator of the activation mechanism can be preferred. In this case, the self-leveling feature of the device ensures high degree of parallelism (on the sub-micron scale) between two surfaces that the pressure needs to be applied to and the ability to control the exerted force with high precision without the need of high-precision alignment tools (In other words, the design obviates the need for extensive high-precision mechanics that would be needed otherwise to achieve the degree of uniformity in force distribution and dynamic force regulation in real time.)

In such a case, the assembly features a pneumatic, as opposed to mechanic, coupling between the movable and fixed portions of the holding device. The principle of pneumatic coupling is based on the Pascal's law of equal pressure distribution in a chamber filled with air or other type of gas to equalize pressure inside an enclosure defining a volume. Such pressure in the enclosure can easily be controlled, thereby allowing the user for precisely adjust the pressure inside the enclosure in real time and on demand. The pressurized gas inside of the enclosure serves, in principle, as a fully compliant layer while conferring the required rigidity to the overall assembly, which is needed to exert significant levels of force. The capability of the assembly to dynamically adjust the pressure and thus force that is applied to the surface attached to the mobile part of the enclosure. If the force applied to the assembly is not distributed equally, for example, one side of a surface of at least one of the first and second components of the container will be exposed to a higher level of force. By virtue of pressure equilibration inside the enclosure, the non-uniform force distribution is compensated for resulting in parallel alignment of the two surfaces.

Figure 13A:
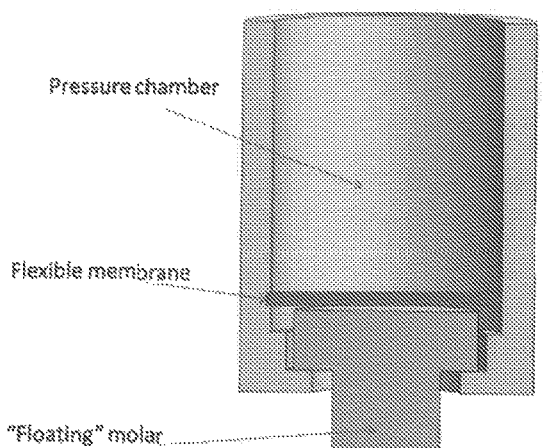
FIGS. 13A, 13B are diagrams illustrating hardware environment and structures facilitating pneumatically-driven reversible operation of the molar of the system to reversibly reposition and seal the components of the cell container together.
Figure 13B:
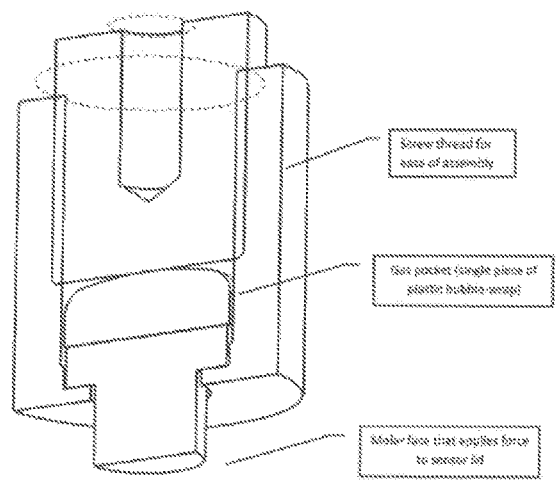

The enclosure can be fabricated in several different ways to deliver gas inside of the chamber. The main part of the enclosure comprises the movable and compliant insert (already referred to above as a "molar") that is coupled to the housing via a flexible polymer membrane. The membrane ensures that the housing is sealed while providing three degrees of freedom to the molar. In reference to the schematic of FIG. 13A, due to the absence of rigid coupling, the molar is "floating" inside of the housing and is only supported by the membrane. The rigidity of the polymer membrane can be chosen so as to fit the force requirements for a particular application. For example, more rigid membranes can be chosen for applications requiring higher pressure levels, whereas more flexible membrane material can be used for low pressure applications for better compliance characteristics. An additional embodiment of the pneumatic device is shown in FIG. 13B, in which whereby a flexible pocket of air, a single or multiple instance of a flexible membrane enclosing an air pocket ("bubble wrap"), is constrained within the housing/molar in order to ensure uniform application of force over the seal area. The embodiments of FIGS. 13A, 13B can be mostly advantageously used in applications where a high degree of uniformity with high repeatability of pressure: The existing mechanical devices with rigid coupling cannot achieve the level of accuracy offered by this device and do not have the capability to adjust the pressure dynamically, in real time.

(D) In yet another related embodiment, the sample-container components 220, 230 may be assembled into the sealed fixture 450 without cell(s) present and with the plunger 260, 364 retracted. Then the cleaning solution, such as 1% Micro-90, is transmitted (flowed) through the closed upon each other components 220, 230 with the optional help of ultrasound, for example to enhance foreign material removal. Then purified water is flowed along the same fluidic path 414 to remove the cleaning solution. Then filtered gas is flowed to remove the water. Consequently, cells in cell medium are flowed along the appropriately arrange pathway to reach a microchamber area(s) of the components 220, 230 to appropriately adhere to/cover such area(s). After a short incubation time, cell medium without cells, or PBS, is flowed to remove unwanted cells from the interstitial areas of the components 220 230 and from the lips/rims/edges of individual microchambers. Then, if needed to displace the PBS, cell medium is flowed to support normal cell function and/or encourage cell growth. After the incubation period, the plunger 260, 364 is actuated thus creating a seal between the components 220, 230 to form the sealed container 450. The advantage of this alternative approach is the ease of elimination of unwanted foreign material and robust assay processing that is not subject to operators/users errors and/or environment variability.

Liquid or gas can be brought in one of the flow-through ports, passed between the substrates when they are separated, or around the two substrates when they are sealed, and exit out the other flow-through port. The advantage of this is the ability to test substrates using different molecule concentrations, as well as to expose the live cells within the microwell substrate to perturbagens.

Non-Limiting Summary.

Accordingly, FIGS. 2, 3, 4A, 4B, 5 illustrate examples of a fully-contained system with a holding device configured for the manipulation and clamping of microstructured substrates for use in analyzing biological processes in sealed microchambers formed between the microstructured substrates (when sealed to one another).

Such system is configured to house and reversibly change operational status of first and second components forming a container for holding a live cell or small cluster(s) of live cells. The system includes a holding device that comprises (i) upper and lower portions, where the lower portion structured to contain a trench, with a first opening throughout a bottom thereof, and (ii) a mechanism removably and repositionably integrated with the upper and lower portions and configured (a) to change the operational status by reversibly bringing together and separating from one another the first and second components when said first and second components are disposed between the upper and lower portions, and (b) to reversibly sealingly affix the first and second components to one another to form the container for holding the live cell (as a result of a reposition of the mechanism) with at least one fluidly-sealed chamber present in such container.

The mechanism may additionally include a clamping system operably coordinated with the upper and lower components to clamp or latch to one another the upper and lower portions to form a cavity therebetween, the cavity being sized to accommodate the first and second components.

The upper portion may include a first fluidic port, a second fluidic port, and at least one channel which, when the upper and lower portions are brought together to form a cavity therebetween, defines a sealed fluidic pathway connecting the first fluidic port, the cavity, and the second fluidic port. The so-formed cavity contains the trench of the lower portion.

Alternatively or in addition, the mechanism may include a fluidic pathway therethrough, which pathway is accommodated to apply a force (generated by suction created outside of the system) to a surface of the mechanism that faces the lower portion during the operation of the system.

Alternatively or in addition, the mechanism may include a three-point wave spring disposed to apply a balanced load to the first component, in operation of the system, to bring together the first and second components. Alternatively or in addition, the mechanism may include a plunger configured to be moved forward and retracted (with respect to the lower portion) in any of manual, electromechanical, pneumatic, and other automated fashion.

Alternatively or in addition, the mechanism may include a plunger, configured to be moved forward and retracted, with respect to the lower portion, in any of (i) manual, (ii) electromechanical, and (iii) pneumatic fashions, and further may include a three-point wave spring disposed to apply a balanced load to the first component to bring together the first and second components.

The holding device may be complemented with a holder plate that is structured in a microplate format, and that contains (a) a holder plate cavity, dimensioned to accommodate the holding device; and (ii) means for controllably defining a temperature of said holding device. In a specific case, such holder plate includes a holder plate aperture in a bottom portion of the holder plate, this aperture being dimensioned to align the first opening in the lower portion of the holding device when the holding device in disposed in the holder plate cavity. In one implementation, the system may include a source of radiation configured to deliver radiation through the first opening of the lower portion towards the upper portion.

A method for operating such a system includes the steps of applying a force of suction, generated outside of the system, to hold the first component against a surface of the mechanism to facilitate an alignment of the first and second components; and reversibly sealingly affix the first and second components to one another as a result of repositioning of the mechanism to form the container with at least one fluidly-sealed (hermetically-sealed) chamber formed inside the container.

In a specific situation when the mechanism contains at least one of (a) a plunger, configured to be moved forward and retracted, with respect to the lower portion, in any of (i) manual, (ii) electromechanical, and (iii) pneumatic fashions, and (b) a three-point wave spring disposed to apply a balanced load to the first component to bring together the first and second components, the method may additionally or alternatively include the step of channeling a fluid between the first and second components (when the plunger is in a retracted position to define a gap between the first and second components disposed between the upper and lower portions). In a particular case, such method additionally includes the step of during the time of channeling, cleaning at least one of the first and second components with the channeled fluid in either a first mode (characterized by presence or influence of at least one of an ultrasound and a surfactant), or in a second mode (characterized by absence of both the ultrasound and the surfactant). Alternatively or in addition, the method includes changing a velocity of the process of channeling the fluid to settle the live cells onto at least one of the first and second components. The process of changing the velocity may result in stopping the channeling of the fluid and/or changing the velocity again after the live cells have stably settled onto at least one of the first and second components to remove unwanted cells and debris from a space surrounding at least one of the first and second components. The method may include a step of comprising introducing perturbagens into the fluid being channeled to trace biological pathways through the system.

In a particular case when the holding device defines a fluidic channel therethrough (at the timed when the upper and lower portions are clamped together and the first components are disposed between the upper and lower portions) with the trench being part of the fluidic channel, in order to maintain or enhance cell viability, the method may additionally include at least one of (i) incubating a cell medium, contained between the first and second components at controlled temperature, by channeling a first fluid at a predetermined concentration through said fluidic channel; and (ii) continuously replenishing the cell medium by channeling a second fluid through said fluidic channel.

Alternatively or in addition, the method may comprise actuating the mechanism to bring the first and second components together to sealingly affix said first and second components to one another; and channeling a fluid through a fluidic channel formed between the upper and lower portions around sealed first and second components to assess a quality of a seal formed therebetween.

With understanding of the general structure of the overall system, the following addresses some of components and/or sub-systems.

Example 1: Configuration of the Sample Container

Figure 6A:
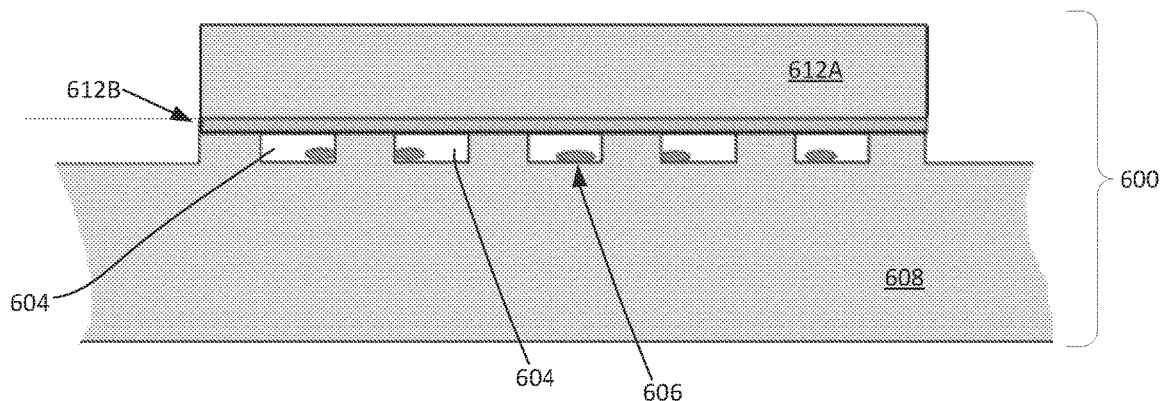
FIGS. 6A, 6B, 6C are schematics illustrating an embodiment of the structural environment for containing single individual cells or small cell clusters.
Figure 6B:
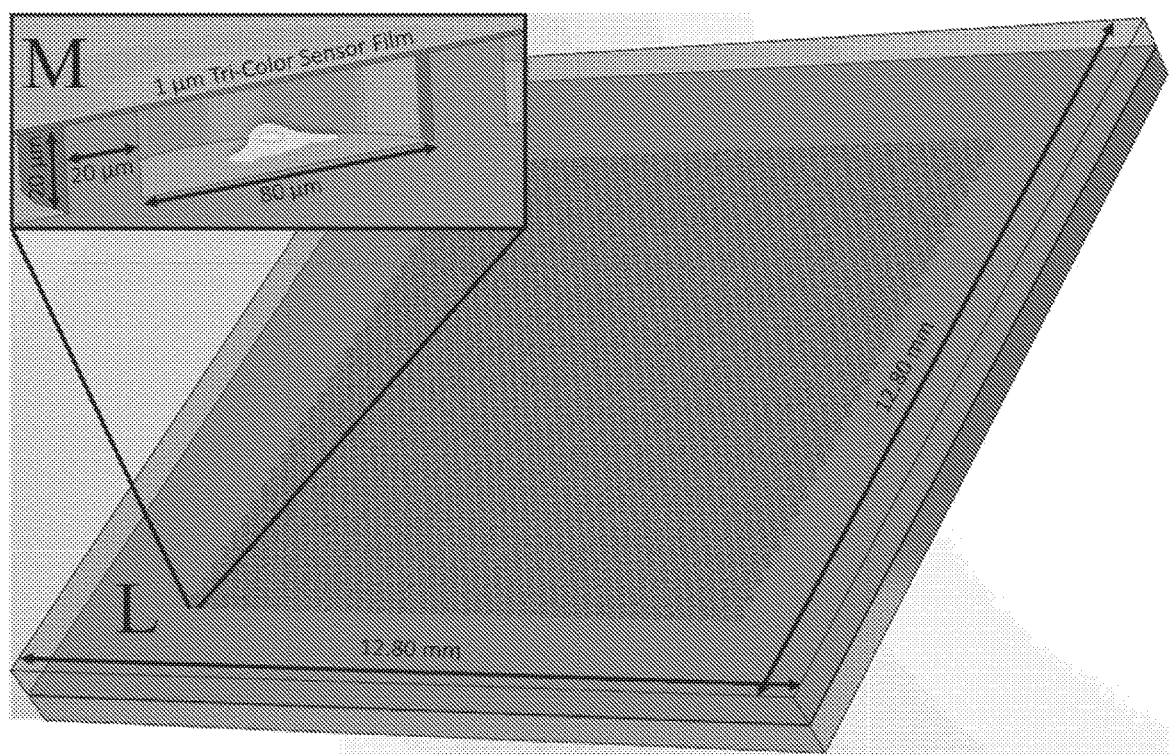
Figure 6C:
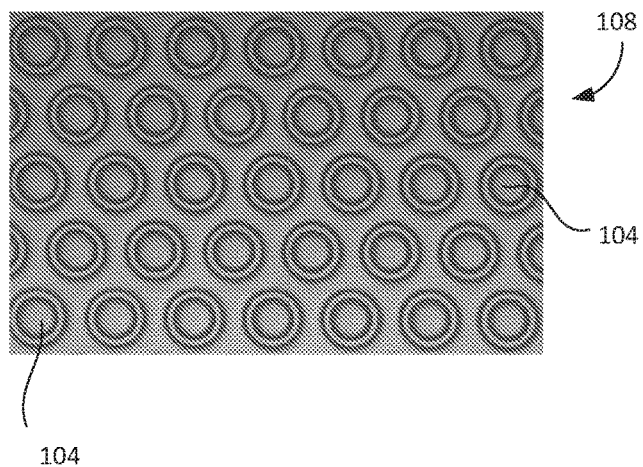

FIGS. 6A, 6B, and 6C schematically illustrate an example of the above-mentioned sample container 450, formed with the use of the components 220, 230. As shown in FIG. 6A, the container is presented in the embodiment 600, while the specific implementations of the components 220, 230 are numbered as 612 and 608. In this example, the component 608 is a well substrate, appropriately sized to include an array of microwells 604 (in some of which during the operation of the embodiment at least one single individual live cell 606 may be placed). The embodiment 600 is shown in already-assembled format, after the component 612 that represents the sensor lid has been placed on top of the well substrate 608 to sealingly (hermetically, fluidly-impenetrably) close the individual wells to form fluidly sealed microchambers limited by the walls of the wells of the individual wells 604 and the surface of the film 612B and the corresponding area of the substrate 612A. As shown in FIG. 6A, the sensor substrate 612A of the sensor lid 612 is complemented with or overcoated with or carries the sensor film 612B.

The sensor film 612B is judiciously fabricated to contain an extracellular optical sensor, which is configured to change the intensity of its emission in real time in response to alterations in analyte concentration inside the microchamber that sensor changes. FIG. 6B illustrates (in an L-portion of the drawing) a microwell array of 4,096 microwells formed in one embodiment of the invention, and in the M-portion of the drawing a cut-out perspective view of an individual microchamber. The arrays were microfabricated in a substrate 608 made of glass to be optically transparent (in a related embodiment, another optically and biologically-suitable material can be used, such as an appropriate grade of optical plastic). FIG. 6C offers a micrograph schematic of a portion of the microwell array of FIG. 6B, in top view. Here, the scale based indicates the extent of 200 μm.

Fabrication of the Well Substrate 108.

In further reference to FIGS. 6A through 6C, an individual microwell 604, with dimensions of about 80×20 μm can accommodate up to 8-10 cells, depending on cell size. The microwell arrays were fabricated using photolithographic methods in an RCA-cleaned fused silica wafer. (The wafer was spin-coated with AZ 4330 photoresist at 3,000 rpm, and UV exposed at a dose of 150 mJ/cm2. The photoresist was patterned with lipped microwell arrays, and the patterns were transferred to the amorphous silicon layer by a dry reactive-ion etching process. The patterned amorphous silicon layer worked as a masking layer during HF wet etching to form the microwell arrays with the height of 15 μm. After HF wet etching, the amorphous silicon left on the fused silica was completely removed by a second RIE step.)

Sensor Probe Synthesis and Sensor Solution Preparation.

Figure 7B:
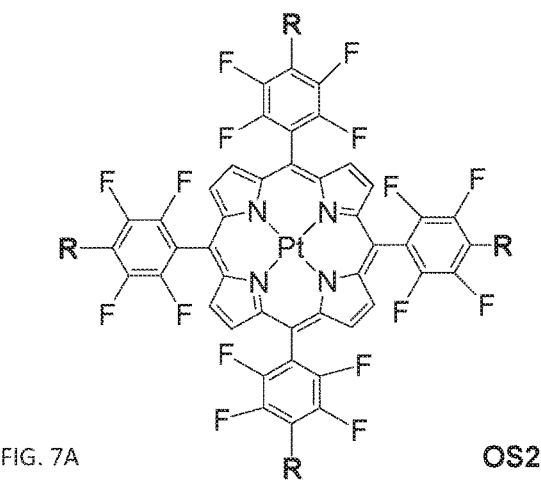
Figure 7B:
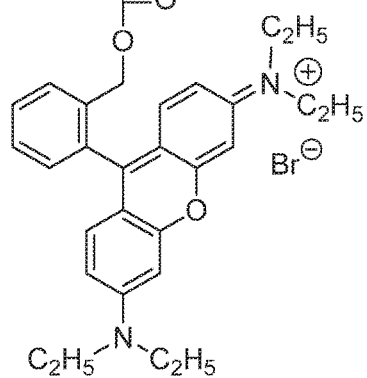
Figure 7C:
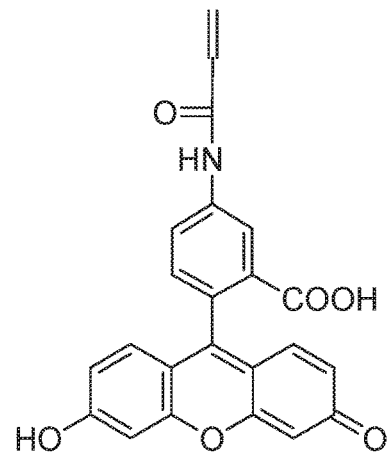
Figure 7D:
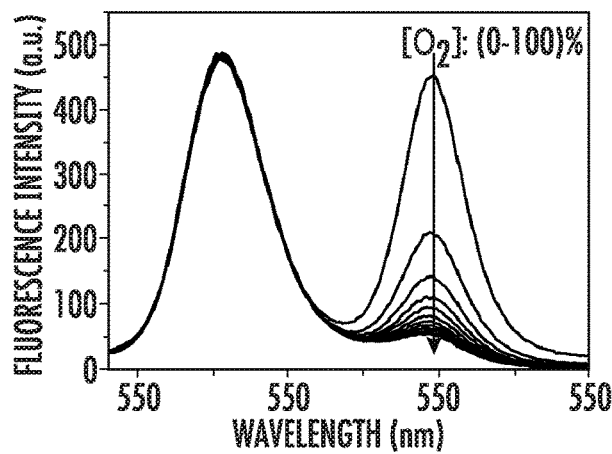
FIGS. 7D, 7E, 7F, and 7G, respectively, include plots representing, respectively.
Figure 7E:
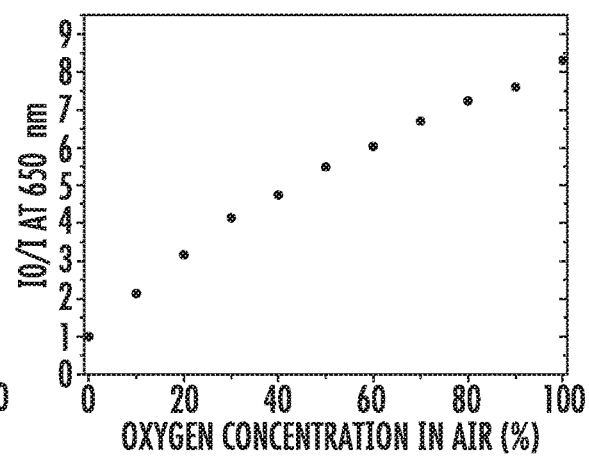
Figure 7F:
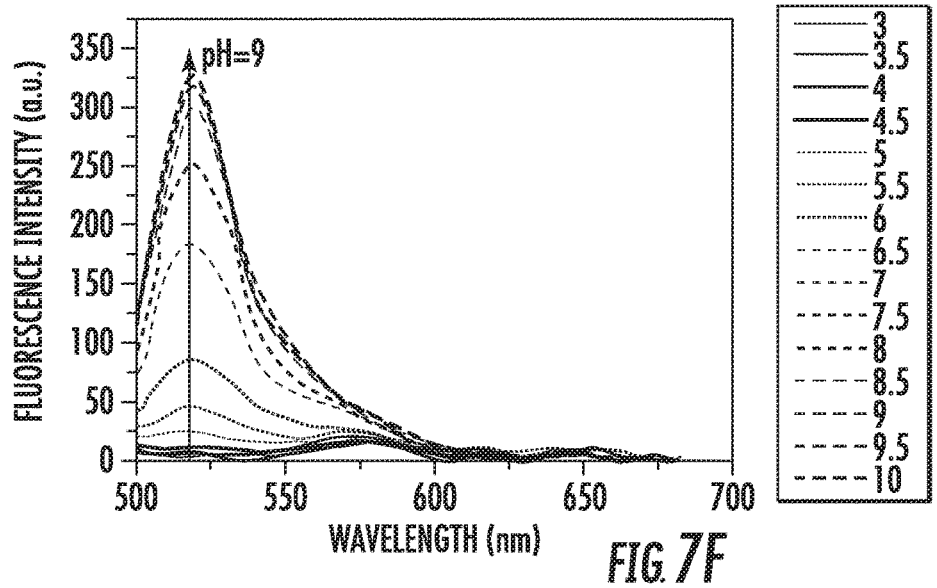
Figure 7G:
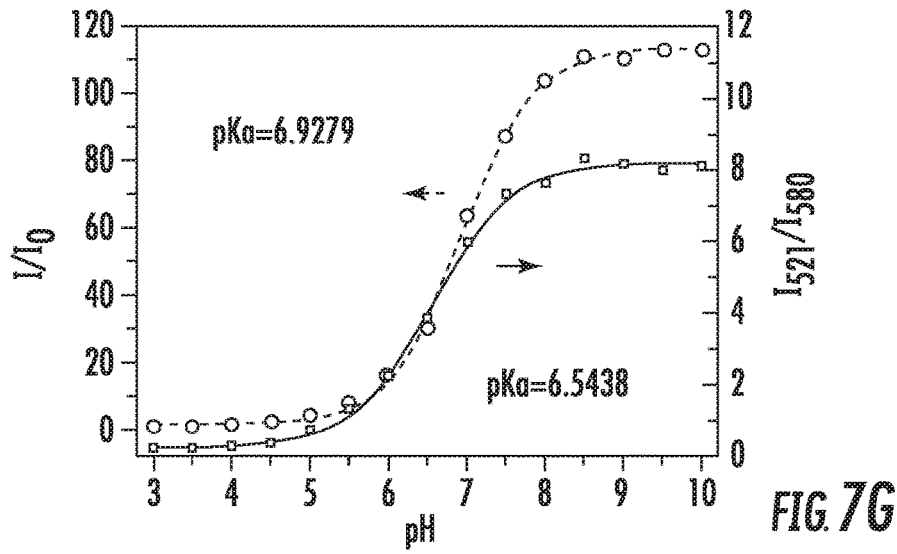

Polymerizable sensor probes—such as an oxygen probe (OS2), pH probe (S2), and an oxygen/pH insensitive reference probe (Rho-MA)—were prepared according to procedures known in related art. Parameters and characteristics of the probes are illustrated in FIGS. 7A, 7B, 7C, FIGS. 7A, 7C illustrate molecular structures of the sensors (oxygen and pH), while FIG. 7B shows the molecular structure of the reference probe. FIG. 7D provides a spectrum of the sensor's emission produced in response to different levels of dissolved oxygen. The emission peak centered at 580 nm is signal from the reference probe and does not respond to alterations in oxygen concentration. FIG. 7E illustrates a ratiometric sensor response to changes in dissolved oxygen concentration in aqueous solution. FIG. 7F contains a curve representing changes in sensor emission spectrum in response to varying pH. The two smaller emission peaks centered at 580 nm and 650 nm are reference and oxygen sensor emission, correspondingly, and show no response to pH changes; FIG. 7G contains sigmoidal relative (curve B) and ratiometric (curve A) response of the sensor to changes in pH, showing excellent sensitivity in the physiological range with pKa of 6.54.

The stock solutions of the oxygen sensor and pH sensor were prepared separately. The oxygen sensor stock solution was prepared by mixing 850 mg of 2-hydroxyethylmethacrylate (HEMA), 50 mg of acrylamide (AM), 50 mg of polyethylene glycol dimethacrylate (PEGDMA), 1 mg of Rho-MA, and 5 mg of OS2. The pH sensor stock solution was prepared by mixing 850 mg of HEMA, 50 mg of AM, 50 mg of PEGDMA, 1 mg of Rhod-MA, and 1 mg of S2. Two hundred μL of each stock solution were mixed together followed by addition of 6 mg azo-bis-isobutyronitrile (AIBN). Then, 100 mg of 4-arm polyethylene glycol (PEG, MW=5,000 g/mol) was added and stirred for 20 minutes until PEG was completely dissolved. The solution was filtered through a 0.45 μm nylon membrane to yield a clear, dark pink solution.

Formation of the Sensor Film 612B.

The sensor film 612B with 3-4 μm thickness was created by sandwiching the sensor stock solution between fused silica wafer or substrate 612A (that contained microfabricated shims of photoresists with a 5 μm height to provide a gap of desired size) and a cover glass slip or slide, and then appropriately removing the cover slip.

In particular, to prepare the fused silica wafers, a photoresist SU8-2001 solution was made by diluting SU8-2005 (Microchem Corp., Westborough, Mass.) to a final solid concentration of 23% by using the SU8-2000 serial thinner (Microchem Corp., Westborough, Mass.). The wafer was plasma treated in a plasma oven (Tegal Usher, CollabRx, San Francisco, Calif.) at 200 W for 10 minutes followed by a dehydration step at 160° C. for 10 minutes for improved binding of SU8 to the surface. Immediately following the dehydration, the SU8-2001 solution was applied to the wafer and spin coated at 3,000 rpm for 45 seconds. The coated wafer was then pre-baked at 95° C. for 5 minutes on a hot plate and then exposed at 80 mJ of UV light using a mask aligner (OAI 808 aligner, OAI LLC, San Jose, Calif.) and Omega PL-360LP (Omega Optical Inc., Brattleboro, Vt.) filter. The exposed wafer was post-baked at 95° C. on a hot plate for 5 minutes and developed in an SU8 developer (Microchem Corp., Westborough, Mass.) for 1 minute followed by a hard bake step at 150° C. for 30 minutes. The wafer then was plasma treated together with the cover glass slides using a plasma cleaner (Harrick PDC-001, Harrick Plasma, Ithaca, N.Y.) at 30 W power for 10 minutes to activate the glass surface for a silanization step. The wafer then was vapor-phase silanized by placing it in a glass dessicator along with 200 μL silane ((3-acryloxypropyl) trimethoxysilane, Gelest, 4369-14-6) in an open 1.5 mL Eppendorf tube, and then evacuating the air using a house vacuum for 30 seconds until an absolute pressure of less than 20 mmHg in the dessicator was achieved. The wafer was kept in the dessicator for 4 hours. The cover slip was silanized using the same procedure, but with the use of (1H,1H,2H,2H-perfluorooctyl) trichlorosilane to prevent the sensor from adhering to the surface of the slip. The sensor was cured (polymerized) in the sandwich structure at 80° C. under 100% nitrogen for 90 minutes. The cover slip was removed from the polymerized membrane surface after curing. The polymerized sensor film 112B on the substrate 112A was washed three times with methanol to remove any remaining sensor monomers and any residual solvents.

Hermetic Sealing.

Hermetic sealing of the microwells proved to be nontrivial in practice and required substantial uniformity of pressure distribution between top 612 and bottom 608 components over the active area of the array of wells 604. Hermetic sealing of the microwells 604 was tested by flowing 100% oxygen above the medium to saturate the concentration of dissolved oxygen. The presence of a hermetic seal of the microwells was confirmed if the oxygen sensor inside the microwells did not respond to the increase in dissolved oxygen concentration on the outside. On average, complete hermetic sealing was demonstrate in about 70% of wells. The seal test was run at the end of each assay to determine and discard from further analysis microwells that were not fully sealed. (The main reason for incomplete seals was postulated to be the presence of microparticles on the lips of the microwells, which prevented intimate contact between the well substrate and sensor chips.) The sensor film 612B with a typical thickness of 3-5 μm acted as a compliant layer by deforming in response to the applied pressure, squeezing the lid 612 and the substrate 608 together, and alleviating the effect of particles on the lips. (However, in some cases the sensor compliance is not sufficient, which results in sub-micron sized gaps in the wells and thus leaking. To address this, the sensor film 612B thickness can be increased by 2-3 μm along with a corresponding increase in the depth of the wells 604 to compensate for the resulting loss in the total well volume.)

Example 2: Configuration of the Sample Container

The alternative embodiment 800 of the sample container is illustrated in FIG. 8 in side view before the sample container 800 is assembled and held in the holding device 300. The components of the container 800 include the sample substrate 808, overcoated with parylene C, 810 (on top/outer surface of which individual cells or cell clusters 806 have been deposited for the measurements) and the sensor lid 812 the bottom surface of which (that is, the surface facing the sample substrate 808) to form an array of cavities or micropockets 804 (each of which is bounded by lips or edges 814 and at least some of which extracellular sensors 816 are disposed).

In one implementation, each micropocket was 60 μm in diameter and 15 μm deep, placed around the circumference of the lid 812, which had an inner diameter of 480 μm, with a lip width of 80 μm. In the use of such embodiment 800, each such lid was aligned with a 3×3 array of wells (bottom substrate), with a center to center spacing of 700 μm. The fused silica substrate 808 was coated with a thin layer 810 of Parylene-C, and a patterned extracellular matrix (ECM) protein (e.g. poly-L-lysine). For experiments, each substrate was placed on a borosilicate disc that has been modified by gluing an acrylic ring around the circumference to mimic a Petri dish. This pseudo-dish was sterilized under UV light before beginning an experiment.

Lid Design and Fabrication.

The lid 812, with an inner diameter of 480 μm, contained an array of microwells ("micropockets") 804 of 60 μm inner diameter, and was capable of holding up to 9 different spatially separated optical sensors. A schematic description of the major steps involved in the generation of a lid, along with dimensions and sensors, is shown in FIG. 9A. The microfabrication process involves an RCA cleaning step of 101.6 mm diameter double sided polished fused silica wafers (Mark-optics, CA), to remove organic and inorganic residues. A 200 nm layer of silicon nitride was deposited onto the substrates as the masking layer, using low pressure chemical vapor deposition (LPCVD: 250 mT, 835° C., 100 sccm $SiH_2Cl_2$, 20 sccm $NH_3$). A 1 μm layer of positive photoresist (AZ 3312, Mays Chemical, Indianapolis, Ind.) was spin-coated and patterned onto the substrate, using standard photolithography techniques. This step defines the micro-pocket geometry inside the micro-well lid. A reactive ion etch (RIE) was then performed to transfer the pattern into the $Si_3N_4$ layer by selective etching. The photoresist was removed using Microstripper 2001 (Columbus Chemical, Columbus, Wis.), and 49% (wt/wt). Hydrofluoric acid (HF) was used to wet etch the micro-pocket to a depth of 15 μm at room temperature. A second photolithography step was performed to define the lid micro-well. A 3 μm layer of AZ 4330 (Mays Chemical, Indianapolis, Ind.) was used to achieve uniform coating and improve step coverage. A second RIE of $Si_3N_4$ was used to transfer the microwell pattern into the $Si_3N_4$ layer. The AZ 4330 was removed, and 49% HF was used to etch the microwell to a depth of 30 μm. A third AZ4330 photolithography and $Si_3N_4$ dry etch, followed by photoresist strip, and HF wet etch, were performed to form the lip. The remaining $Si_3N_4$ was removed by the fourth RIE dry chemical etch, completing the microchamber lid fabrication. The wafer was diced into 3.5×3.5 mm pieces afterwards. FIG. 9B provides a fluorescence emission micrograph of a 3×3 array of lids containing the oxygen and pH sensors.

Sensors.

For monitoring oxygen consumption rates, a platinum porphyrin derivative, Pt (II) octaethylporphine (PtO534, Frontier Scientific, Logan, Utah) was used. For pH monitoring, the sensor monomer acryloylfluorescein was used. Briefly, 180 mg of fluoresceinamine, and 60 μL of acryloylchloride were added to 20 ml of dry acetone, and stirred for 1 h in the dark. The precipitate was filtered and washed, first with acetone, and then with dichloromethane, to get 160 mg of sensor monomer—referred to as S2. The sensor stock solution was prepared by mixing 1 mg of S2, 800 mg of 2-hydroxyethyl methacrylate (477028, Sigma-Aldrich St. Louis, Mo.), 150 mg of acrylamide (01696, Sigma-Aldrich St. Louis, Mo.), 50 mg of poly(ethylene glycol) dimethacrylate (409510, Sigma-Aldrich St. Louis, Mo.), 10 mg of azobisisobutyronitrile (755745, Sigma-Aldrich St. Louis, Mo.), and 250 mg of 4 arm poly(ethylene glycol) (A7020-1, JenKem Technology, Allen, Tex.) under stirring, at room temperature, until a clear, homogenous and viscous solution was obtained. This solution was stored at 4° C. until further use.

Sensor Deposition.

The lids 812 were cleaned in 70% isopropanol, sonicated in DI water for 30 minutes to remove particles from the lid surface, and then dried using nitrogen gas. The chips were placed on a 1"×3" microscope glass slide, and plasma cleaned for 60 min at 500 mT air, in a plasma oven (PlasmFlo PDC-FMG, Harrick Plasma, Ithaca, N.Y.). Immediately after plasma cleaning, the chips were placed into a dry-seal glass vacuum desiccator (EW-06536-30, Cole-Parmer North America, Vernon Hills, Ill.) with trimethylsilylpropyl acrylate (475149, Sigma-Aldrich, St. Louis, Mo.) for vapor-phase silanization. The chips were silanized for three hours, under 28 in Hg pressure. The sensor material was then deposited into the lids, using a contact pin printing technology that was developed in-house. The deposition system consists of a print head with a free-floating micropipette (TIP 10TW-L, World Precision Instruments. Sarasota, Fla.). Initially the micropipette is dipped into a stock solution of the sensor, to allow the sensor to fill the tip of the micropipette by the capillary action. The tip was then positioned on top of the micropocket, and brought into contact with the silanized bottom of the micropocket, to allow a few pL of the sensor material to dispense into the micropocket. Immediately after the deposition is complete, the sensor was cured at 80° C. for 18 hrs under a 100% nitrogen atmosphere. A fluorescent image of the lid, after deposition with oxygen and pH sensors, is shown in FIG. 9B.

Sensor Calibration.

Figure 10A:
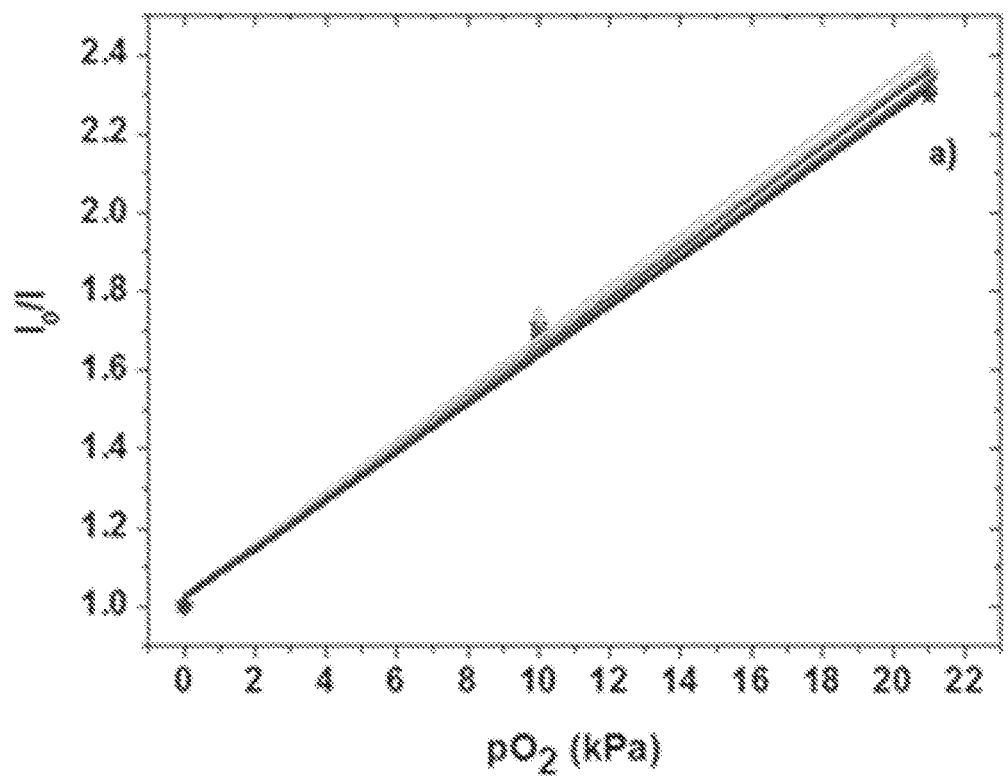
FIGS. 10A, 10B: Sensor calibration results from five different micropockets in one lid.
Figure 10B:
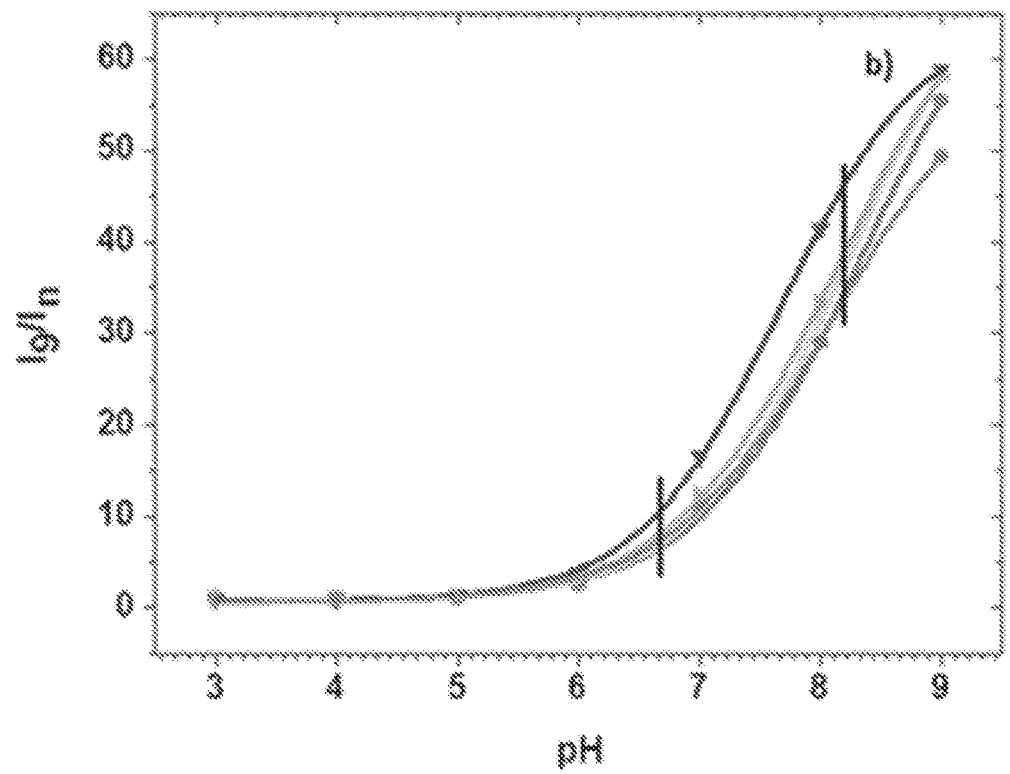

The $O_2$ and pH sensors were calibrated by varying corresponding variables over time. For oxygen sensor calibration, the lid was immersed in DI water, or cell growth medium, and different dissolved $O_2$ concentrations were achieved by purging the solution with mixtures of $N_2$ and $O_2$ gas of known concentrations. The mixing of gas was done in a mass flow gas manifold controller (MC10SLMP-D, Alicat Scientific, Tucson, Ariz.). For pH calibration, the lid was immersed in a Petri dish containing a 5-7 ml of Britton-Robinson buffer with known pH value. Buffers with differing pH were used to measure the sensor response. The experiment was performed in a pH range of 3-9. FIGS. 10A, 10B shows the calibration results of the oxygen (a) and pH (b) sensors. The Stern-Volmer graph in FIG. 10A shows the intensity response curves corresponding to different oxygen partial pressures for five different lids of a 3×3 array. The response curves have had a linear curve fit applied, using linear regression. The response of the pH sensor is described by a sigmoidal function (Boltzmann fitting) as described by following equation:

$$I_9/I = A_2 + \{(A_1-A_2)/(1+\exp[(x-x_0)/dx]\}$$

where $I_9$ is the intensity at the highest pH (pH=9) value used in measurements, I is the intensity at any given pH, $A_1$ is the initial value, $A_2$ is the final value, $x_0$ is the point of inflection, dx is the width of the sigmoidal curve, and x is the corresponding pH value. The 2 value of the individual curves is greater than 0.9995, indicating a reliable fit. The average pKa of the nine sensors from a 3×3 array is 8.2 (ranging from 7.7 to 8.3).

Cell Culture.

Immortalized human esophageal epithelial cells (CP-D) derived from patients with Barrett's esophagus with dysplasia were used in one experiment. Cells were cultured in T75 tissue culture flasks (Corning, Corning, N.Y.) to approximately 80% confluence, at which time they were trypsinized, centrifuged at 900 rpm for 3 minutes, and re-suspended in 2 mL of cell growth medium. The cells were grown at 37° C., under 5% $CO_2$ atmosphere, in cell culture flasks using GIBCO® Keratinocyte SFM cell growth medium (Invitrogen, Carlsbad, Calif.), supplemented with hEGF (Peprotech, Rocky Hill, N.J.) at 2.5 μg/500 mL, BPE (bovine pituitary extract) at 25 mg/500 mL, and penicillin/streptomycin solution (Invitrogen) at 100 units/100 μg/mL. Cells were detached from the flask bottom using 0.05% trypsin-EDTA solution and transferred to an Eppendorf tube for patterning. The working medium was obtained by adjusting the pH of DMEM—Dulbecco's Modified Eagle Medium (Sigma Aldrich, St Louis, Mo.) to 7.4, using NaOH and HCl. The modified medium is supplemented with penicillin/streptomycin solution, and stored in a cell culture incubator for use.

Bottom Substrate Fabrication and Cell Patterning.

Figure 11A:
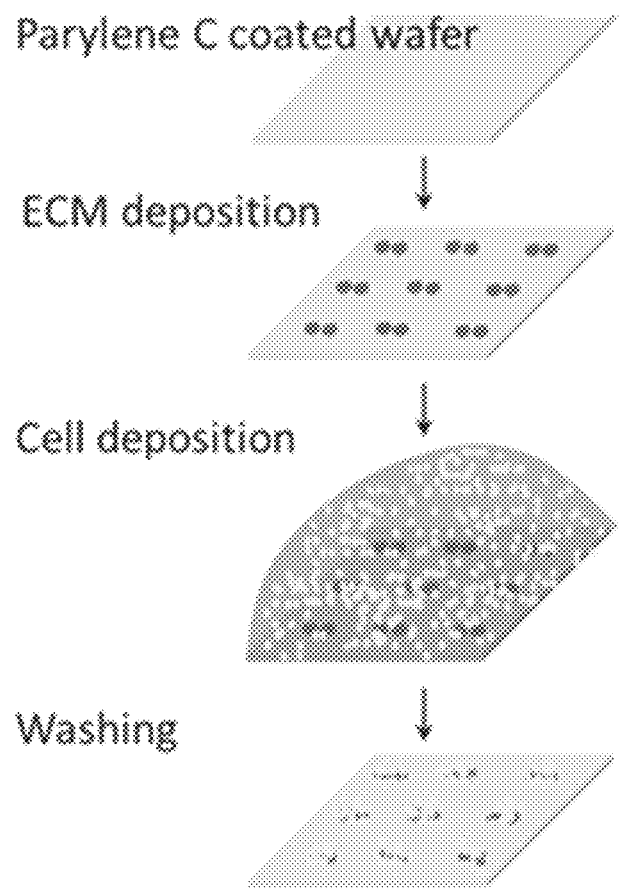
FIGS. 11A, 11B: Cell cluster formation.

The process flow of cell patterning is shown in FIG. 11A. Fused silica wafers were RCA cleaned to remove contaminants, and then coated with Parylene C using a Parylene deposition system (PDS 2010 Labcoater 2, Speciality Coating Systems, Indianapolis, Ind.). The deposition parameters were adjusted to produce a thin layer (3-4 μm) of Parylene C on the wafer, as per the manufacturer's recommended specifications. The coated wafer was then diced into 11×11 mm squares. These glass substrates were cleaned in a water sonication bath, followed by drying. The substrates were then plasma treated for 60 min, at 500 mT air pressure, in the plasma oven. Extra cellular matrix (ECM) protein fibronectin (F1141, Sigma-Aldrich St. Louis, Mo.) was volumetrically diluted with water to yield 0.01% concentration. 40-50 µL of the fibronectin solution were deposited on the glass substrate in a pattern corresponding to the lid array geometry. The deposition was performed by a non-contact piezoelectric dispensing robot (Rainmaker au301, Aurigin Technology Inc., Phoenix, Ariz.). Each location was deposited with two spots, and each spot was made up of two drops. The substrates with patterned fibronectin were then stored at 4° C. until further use.

Figure 11B:
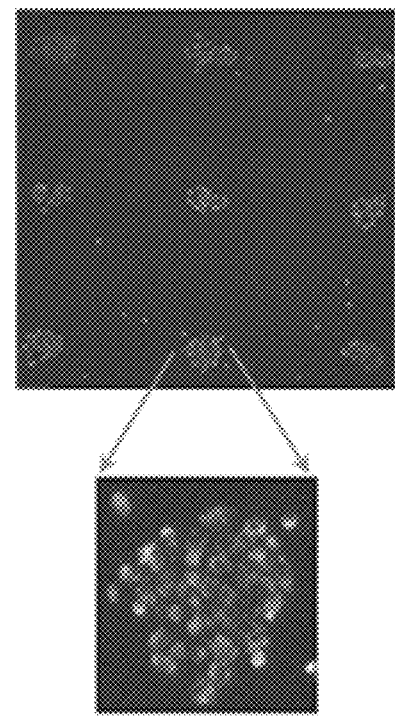

For cell patterning, $10^5$ cells suspended in 50 µL of cell growth medium were dispensed onto the substrates that had been patterned with fibronectin, and incubated for 10 minutes at 37° C., under 5% $CO_2$ atmosphere. The substrates were then washed several times using PBS to remove excess cells from the interstitial areas. Three washing steps were optimal to achieve 30-50 cells/spot with few interstitial cells, as shown in FIG. 11B. The patterned substrates were kept in the modified DMEM until further use.

For fluorescence labelling of the nuclear DNA and mitochondrial membrane potential, in live cells, we used Hoechst 33342 (H1399, Invitrogen, Grand Island, N.Y.) and JC-1 (T-3168, Invitrogen, Grand Island, N.Y.) dyes, respectively. A working solution of 1 µg/ml of Hoechst 33342 was prepared, as per manufacturer's recommendations. The cells were stained with working solution and incubated for 30 minutes before the experiment. A 1 mg/ml solution of JC-1 was prepared by mixing 2.5 mg of JC1 with 2.5 ml of DMSO. The cells were stained using a DMEM solution of 1 µg/ml JC-1, made from the stock solution. The working solution of JC-1 was mixed thoroughly by vortexing for 60 minutes, using a vortex mixer (MixMate, Eppendorf, Hauppauge, N.Y.). The cells were stained with JC-1 for 30 minutes, and washed three times with DMEM before the experiment.

Microchamber Validation.

Figure 12A:
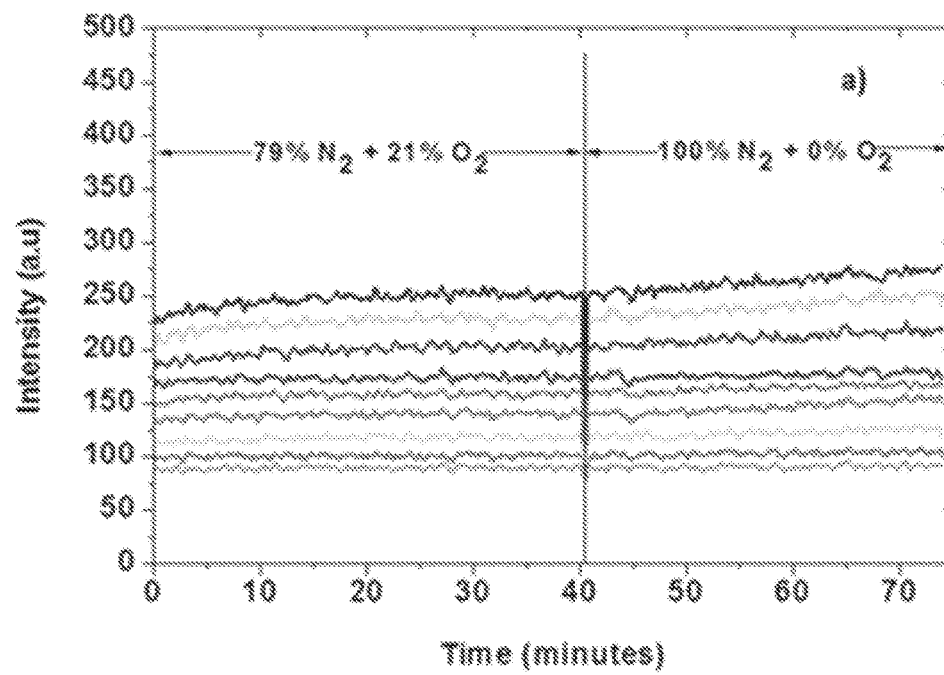
FIGS. 12A, 12B: Device calibration.
Figure 12B:
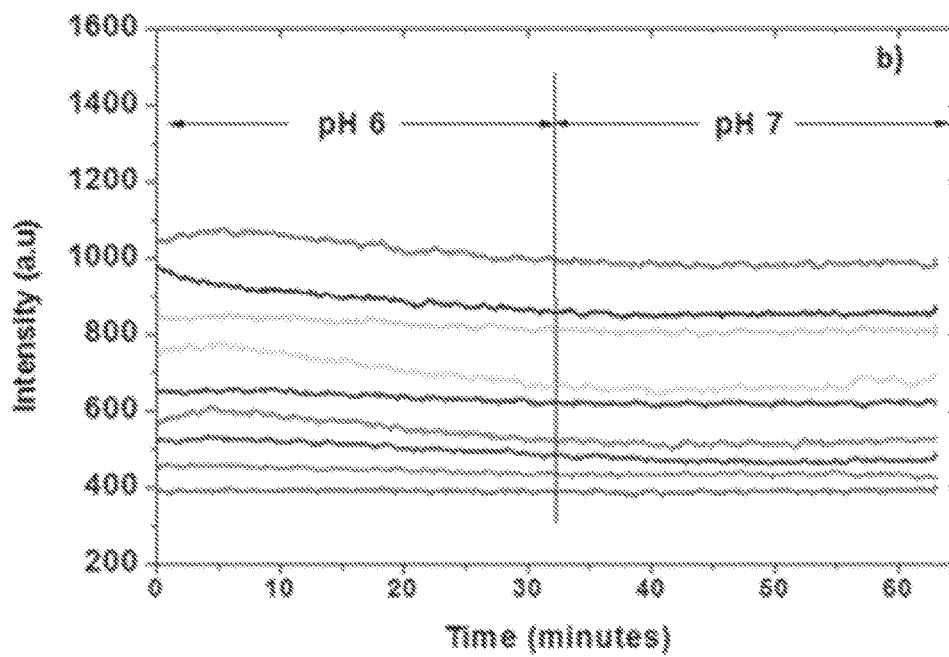

The feasibility of the microchambers (of the assembled sample container) to produce a hermetic seal in this embodiment 800 was tested for each lid 812. Once the microchamber was formed, the media was purged with different known concentrations of oxygen and nitrogen. While purging, the fluorescence intensity of the oxygen sensor in the lids was monitored as a function of time, over a period of 60-80 minutes—which is comparable to the typical time of an experiment. FIGS. 12A, 12B show the results of intensity plots of the oxygen and pH sensors. The oxygen sensor (FIG. 12A) shows negligible intensity change in response to the change in outside oxygen concentration. Similarly, as shown in FIG. 12B, negligible intensity response of the pH sensor can be observed in response to the change in the outside pH. Both tests indicate that the microchambers are hermetically sealed for both oxygen and pH. We note that a lid, once calibrated and checked for hermetic seal generation, can be used repeatedly—given proper cleaning steps between the experiments to avoid cross-contamination.

It is appreciated that, while the above-discussed specific details describing the manipulation of sensors, cell culture, and validation of the sealed microchambers were disclosed in connection of the embodiment 800, the same or similar preparation and verification steps can and typically are performed when, in operation of the system, different embodiments of the cell-enclosing container are used.

Example 3: Configuration of the Sample Container

Figure 14A:
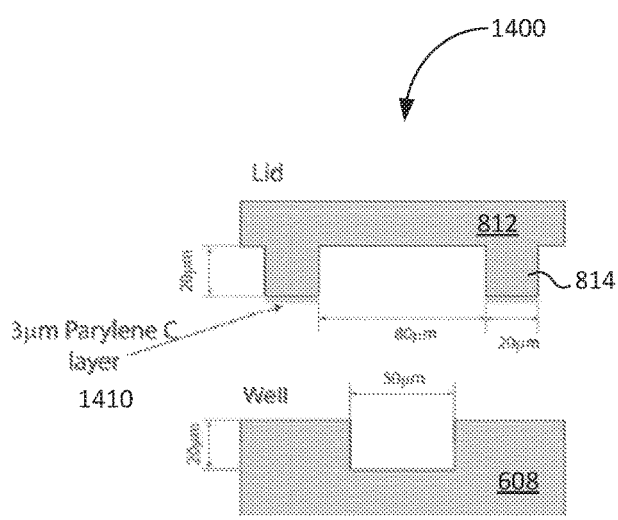
FIGS. 14A, 14B present an alternative embodiment of a container for individual living cells and/or small cell clusters.
Figure 14B:
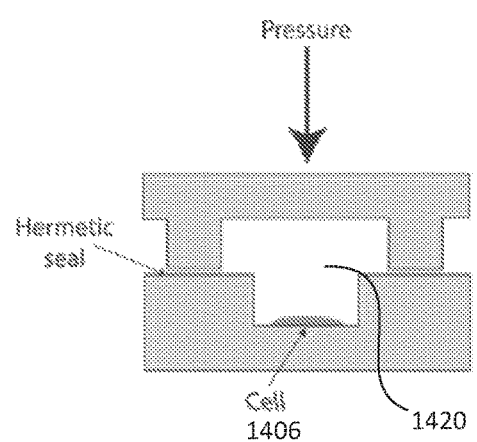

The related to the embodiments 600, 800 design 1400 of the single-cell container is presented in FIGS. 14A, 14B. Here, the first component of the container is structured according to the configuration of the lid 812, while the second component of the container is structured according to the configuration of the microwell substrate 608, between which there is dispose a sealing layer 1410 on the surfaces of the lips 814. When exposed to appropriately-applied pressure in the activating mechanism of the inner portion (204, 304) of the holding device 300, the components are pressed together to form a fluidly-sealed container 1400 with at least one of the volumes 1420 defined by a microchamber formed between the first and second components.

Additional Considerations.

(A) Determination of Leaks at the Cell Container.

In order to increase the overall operational throughput of a system requiring hermetic sealing, such as the system 300, the use of partial seals for determination of leaks in the holding device 300 can be employed. Specifically, the method is based on the determination of the leak rate of the analyte of interest by creating a well-defined gradient of the analyte across the inside of the chamber containing the analyte and the outside of the chamber, while performing measurements of the analyte concentration change rate inside of the chamber. If, for example, one were to measure oxygen consumption rate of a live single cell or several cells or cell clusters in a placed in an only partially-hermetically-sealed container (600, 800, 1400) in the system 300, the presence of a leak would confound the measurement. The apparent oxygen consumption rate would be lower due to the influx of dissolved oxygen from the medium surrounding the microchamber of the container. The inability to precisely control contamination, surface flatness and force distribution for seal production across the chamber prevents one from precisely predicting and/or reproducing the quality of seal every time when a measurement is conducted. It is understandable, therefore, that when the cell container is sealed only partially and not completely, the measurement data have to be discarded.

The methodology described here enables the determination of the leak rate and thus makes measurements of the analyte change rates in partially sealed microwells (604, 808, 1400) possible. To determine the leak rate of a microchamber in the system, the outside concentration is changed to a particular known value during an ongoing measurement. The change in concentration results in an analyte gradient across the walls of the microchamber. As a result, the apparent analyte change rate will change from the previous rate, i.e. before the change on the external concentration of the analyte. By calculating the difference between the initial and final apparent analyte change rates in moles/sec it is relatively easy to determine the leak rate and then the actual analyte change rate due to the reaction (e.g. oxygen consumption by a cell). Notably, this methodology only applies for steady-state or equilibrated conditions, when all transient events resulting from the change of the analyte concentration on the outside of the chamber (604, 804) are completed before the determination of the leak rate can take place. The method can be applied for determination of leak rates of multiple analytes whereby external concentrations of each of the analytes need to be changed accordingly. In multiparameter measurements, where concentration changes of several analytes can be measured simultaneously, a mixture of corresponding analytes of known concentrations can be used to determine the leak rates for each analyte.

(B) Detachment of Single Individual Cells or Small Clusters of Cells from a Supporting Surface in a Sealed Environment after Multiparameter Physiological Phenotype Measurement.

Single-cell harvesting technique enables researchers to detach and transfer single cells from microwells to gene expression analysis after single cell metabolic phenotype measurement. Using a single-cell manipulation platform, one can detach single cells from substrates without inducing stress gene expression given appropriate conditions. This technique proved to be a reliable approach to harvest single adherent cells from glass for downstream analysis. This semi-automated process links real-time multi-parameter physiological characterization of single cells and end-point DNA, RNA and protein level analysis. The method shares broad interest in companies working on cellular heterogeneous response to drugs in the pharmaceutical industry, as well as single cell analysis in the stem-cell and regenerative medicine industry.

Both chemical and mechanical methods have been used to detach adherent cells from substrates. However, mechanical methods are particularly harsh and occasionally can physically damage cells during detachment. Chemical methods typically employ proteases to digest extracellular matrix components and adhesion proteins and to disrupt the physical attachment of the cell to its substrate. When applied excessively, the enzymatic digestion also influences gene expression levels. Mild trypsinization followed with shear flow can be employed to detach single cells. This combined approach was optimized to maximize RNA recovery and minimize gene expression changes in harvested cells.

In reference to FIGS. 15A, 15B, 15C, in order to detach adherent cells from the microwell glass surface, a combination of mechanical and chemical forces were used in some embodiments. Shear flow through the micropipette tip can aspirate single cells out of the microwell; however, applying shear flow may result in damages to the plasma membrane and loss of the cellular RNA. Trypsin is a traditional protease which can cleave adhesion proteins on the cell membrane and detach the cells from the substrate. Excessive trypsinization, especially with regard to trypsinization time, can affect cellular viability and gene transcription. To minimize potential perturbations to the gene transcription profile and the loss of the total RNA during harvesting, a combination of both methods was employed. Our purpose was to examine how the trypsinization time, concentration and flow-rate factors affect the harvesting success rate (HSR) and gene transcription levels. Based on the HSR and gene transcription detection by qPCR on 28S, ACTB and CCL2 (shear flow response gene), HSP70 (general stress response gene), it was found that limiting the range of the trypsinization time to 5-7 minutes and utilize a flow rate range of 2.5-12.5 µL/s is optimum for single cell harvesting.

In conclusion, single-cells can be harvested from the microwells on the cooled stage, using 12.5 µL/s flow-rate and 6 min trypsinization time, and placed into the cap of a microcentrifuge tube containing 200 µL of cell growth medium.

Example of Results of Measurements Performed with the Use of an Embodiment

With the use of the embodiment of the container 800 (described in reference to FIGS. 8 through 12B) secured in the holding device, the physiological measurements were performed on cells contained in microchambers 804, with the use of a modified inverted microscope as described in. The extracellular pH and $O_2$ sensors, and the intracellular JC-1 dye, were excited using a multi-LED illumination source producing light (delivered, as light input 460 into the cell container through the window 234, in operation of the integrate platform). Such light source (LED4C2, Thorlabs Inc, Newton, N.J.) included four LEDs emitting at central wavelengths of 405 nm, 470 nm, 530 nm, 617 nm, and coupled to the epi-illumination port of the microscope. The 395 nm excitation light was obtained by filtering the emission spectrum of the 405 nm LED with an excitation bandpass filter to excite the oxygen sensor. The 475 nm LED was used to excite the rest of the fluorophores (pH sensor and JC-1). Two sets of excitation filters were employed to excite the different fluorophores—one equipped with a bandpass excitation filter (FF01-386/23-25, Semrock Inc., Rochester, N.Y.) for the $O_2$ sensor, the other equipped with a short pass filter (FF01-492/SP-25, Semrock Inc, Rochester, N.Y.), and both cubes had a dichroic beam splitter (FF506-Di03-25X36, Semrock Inc, Rochester, N.Y.). The emission signal was passed through narrow band pass emission filters (FF01-590/20-25 for JC-1 aggregates, FF01-640/14-25 for oxygen, FF01-527/20-25 for JC1 monomers and pH, Semrock Inc, Rochester, N.Y.) mounted in a motorized filter wheel (Lambda 10-2, Sutter Instrument Company, Novato, Calif.), before being detected by an air-cooled electron-multiplying CCD (Cascade 512B, Photometrics, Tucson, Ariz.). Both LEDs were operated in a pulsed mode, and synchronized with the exposure time (20 ms) of the camera, to ensure that the sensors are only illuminated during the image collection cycles. The extra and intracellular sensors' intensity data was extracted from the images by calculating the average pixel intensity in regions of interest (ROI) defined around the sensor areas, and cells, in the corresponding emission spectral channels. Each sensor image was acquired twice—once with the LED excitation, and the other without, for dynamic background determination. The background images were subtracted from the images with the excitation turned on, in real time, to correct for background contributions to the signal. Apart from this, an extra ROI was also placed in the interstitial area between the sensors, and its average intensity subtracted from the background-corrected images, to compensate for stray light reaching the camera. The data acquisition cycles, including the acquisition of the three sensor images ($O_2$, pH and JC-1) and the three background images, were repeated every 8 seconds.

Statistical analyses of the measurement data, data fitting procedures, and ECAR were performed using OriginPro (v. 8, OriginLab Corp., Northampton, Mass.) software. Data analysis software for OCR determination was written using LabView 8.6 (National Instruments, Austin, Tex.).

Physiological Measurements.

Data have been acquired from a total of 123 clusters, with 87 clusters stained with Hoechst 33342, and 36 clusters with JC-1. The data (Table 1) were normalized against the cell count in each cluster.

TABLE 1

Statistical description of OCR and ECAR

| CP-D (n = 123) | Mean | SD |
|---|---|---|
| OCR (fmoles · $min^{-1}$ · $cell^{-1}$) | 0.63 | 0.186 |
| ECAR (mpH · $min^{-1}$ · $cell^{-1}$) | 0.5 | 0.26 |

Figure 16A:
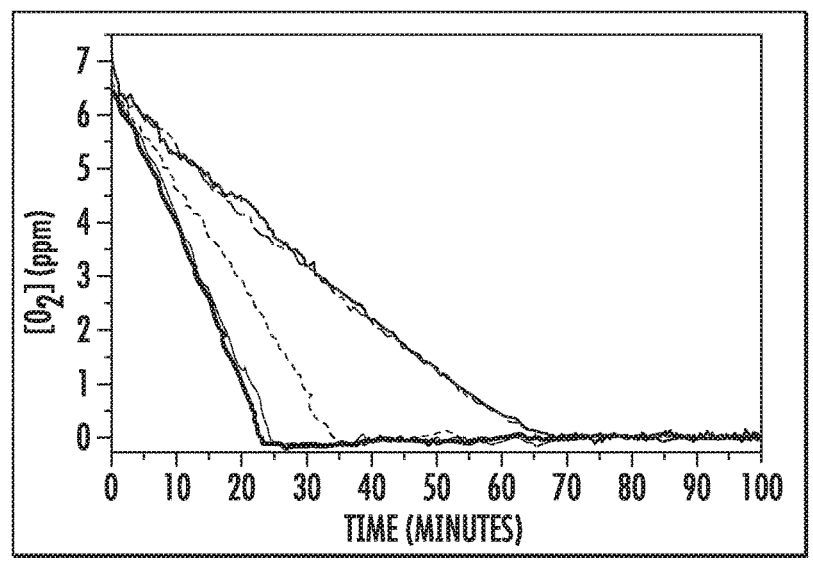
FIGS. 16A, 16B, 16C show real-time simultaneous measurements of oxygen consumption (FIG. 16A), extracellular acidification (FIG. 16B), and changes in mitochondrial membrane potential (FIG. 16C) carried out with the use of an embodiment of the invention.
Figure 16B:
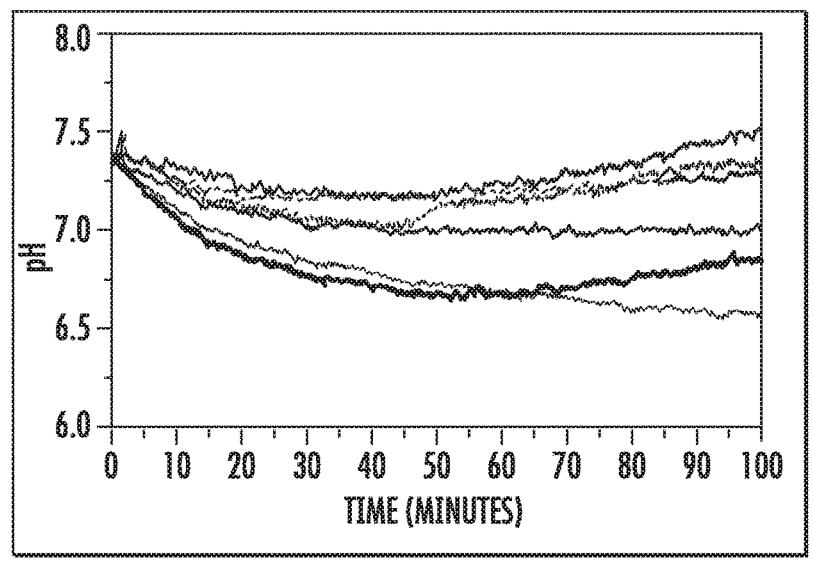
Figure 16C:
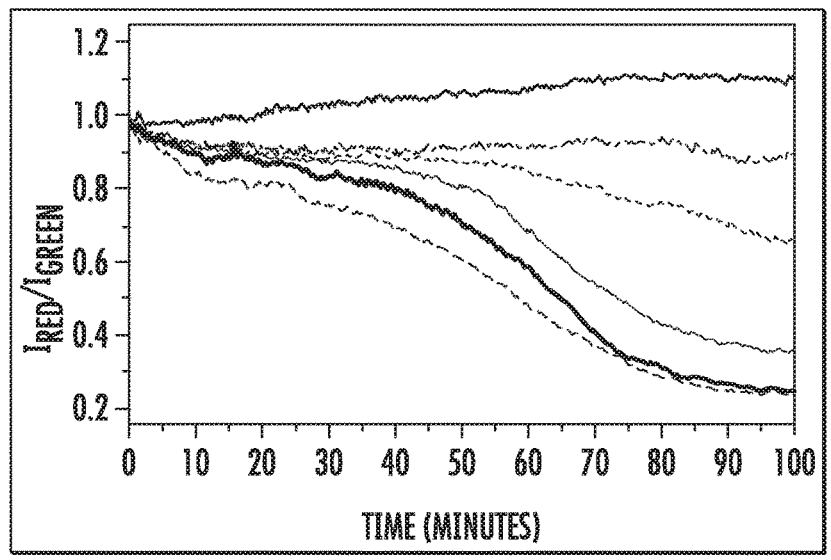

FIGS. 16A, 16B, 16C shows real time simultaneous measurements of oxygen consumption (FIG. 16A), extracellular acidification (FIG. 16B), and changes in mitochondrial membrane potential (FIG. 16C), in 6 clusters of cells placed on the same substrate. All of the corresponding data points were collected with an 8 second window between two consecutive measurements. (Data obtained from the same cluster is color-coded with the same color in all three graphs, in their color version). The $O_2$ and pH sensor intensity data sets were converted into their corresponding units using the previously acquired calibration data. Each MMP curve was individually normalised to the corresponding intensity value at the time point 0. Occasionally, there was a spatial overlap between the cell cluster stained with JC-1 and the sensors (pH and oxygen probes) in the lid, thereby leading to a cross talk between the different spectral windows. Efforts were made to eliminate such possibilities by manually re-aligning the lid. In cases where this was not possible, the data obtained from the cluster was discarded. Due to the temporal variations of the extracellular pH (FIG. 16B), only initial 150 data points were utilized in calculating ECAR. For OCR calculations all the data points in oxygen consumption curves were taken into account. Since the calibration of pH sensor indicates a linear relationship between pH and intensity within a pH range of 6.75-8.3 (from FIG. 12B), the intensity values obtained for the pH sensor were converted to the actual pH values using the following linear equation:

$$pH = \frac{\left(\left(\frac{y_c * I_n}{I_0}\right) - c_c\right)}{m_c}$$

were $I_n$ represents experimental intensity value for which corresponding pH value needs to be calculated, $I_0$ represents the initial experimental intensity value, $y_c$ represents the normalised value corresponding to pH of the initial medium (pH=7.4), $c_c$ represents the intercept value of the calibration curve, and $m_c$ represents the slope of the calibration curve. All $y_c$, $c_c$ and $m_c$ values are obtained by averaging the values of the nine sensors from 3×3 array of each lid.

As shown in FIG. 16A, three clusters (represented by different indicia) consume the total amount of oxygen in the chamber in less than 25 minutes. The corresponding pH variations indicate that the three early consuming clusters have approximately three different temporal zones where their slopes are different: 0 to 25 minutes (decreasing pH value), 25 to 50 minutes (almost constant pH value), and 50 to 100 minutes (increasing pH value)—as shown in FIG. 16B. Corresponding MMP curves in FIG. 16C indicate a depolarization event between 70 and 80 minutes. Cluster 4 (green) has completely consumed oxygen at approximately 35 minutes; its pH variation with first slope (decreasing pH value) appears to end around 25 minutes, after which, it appears to be a constant pH, with slightly increasing pH values towards the end of the measurement. The corresponding MMP value appears to be reducing towards the end of the measurement (beyond 70 minutes). The understanding of any of the potential inter-relationships between any of these variables requires more targeted experiments.

A phenomenon was observed where some of the cell clusters showed a depolarization of MMP, while the others did not. The observed decrease in MMP was always accompanied by an increase in the pH value, or vice versa, and was always coupled with total oxygen consumption. It is known that MMP depolarization can be interrelated to oxygen consumption within the chamber. In this particular case, as shown in FIG. 16A, cluster 1 represented by OCR=0.635 fmoles·min$^{-1}$·cell$^{-1}$, cluster 2 represented by OCR=0.602 fmoles·min$^{-1}$·cell$^{-1}$, and cluster 3 represented by OCR=0.664 fmoles·min$^{-1}$·cell$^{-1}$, are closer to the OCR value (0.63 fmoles·min$^{-1}$·cell$^{-1}$).

FIG. 17 illustrates the relationship between the OCR and ECAR. This particular cell line, CP-D, is dysplastic and genetically closer to esophageal adenocarcinoma. Other cell lines representing different stages of progression have shown different OCRs. These dysplastic cells are more likely to be either in the process of, or already switched to, glycolysis—even with an adequate supply of oxygen for ATP production, also known as Warburg effect—This results in lower oxygen consumption rates. The average OCR in this case is 0.636 fmoles·min$^{-1}$·cell$^{-1}$. Another consequence of the glycolytic phenotype is its potential to increase the microenvironmental acidification. There appears to be a cluster forming around the average ECAR (0.5 mpH·min$^{-1}$·cell$^{-1}$); in spite of the averaging over cluster of cells, the OCR and ECAR relationship demonstrate a significant heterogeneous behaviour as shown in FIG. 17.

The above-presented disclosure describes a new integrated technological platform that enables real-time quantitative multiparameter metabolic profiling, utilizing either or both of extra and intracellular optical sensors, simultaneously. A scalable embedded micropocket array structure, generally fabricated on fused silica substrates, facilitates the integration of multiple, spatially separated extracellular sensors for multiparameter analysis. The creation of hermetically sealed microchambers, containing extracellular sensors deposited in the micropockets with the use of a contact pin printing approach has been demonstrated. The calibration and performance of the microsensors as well as the device functionality, in terms of real-time monitoring of extra-cellular and intra-cellular physiologic parameters, has been demonstrated. Further studies to fully understand the link between OCR, ECAR, and MMP, may help in developing new potential routes for therapeutic intervention. The methods presented here enable the development of specialized modules with similar architecture that, among other applications, can address: the co-culture phenotypic response of structured cell populations of different cell types, examination of fundamental cell signalling questions tied to chemotactic response to stimulus factors, and interrogation of inflammation mechanisms. Our future aims include further miniaturization, and other adaptations of the chip structure; to facilitate simultaneous measurement, with single-cell resolution, of multiple parameters including: intra-cellular pH, ROS and other analytes such as K+, Ca+ etc., in addition to OCR, ECAR and MMP.

While not necessarily stated explicitly, at least one of the operation of the holding device and/or overall integrated platform and/or carrying out the measurements of the cell parameter(s) in such integrated platform and/or analysis of acquired data to produce an appropriate report may be governed by a specifically-programmed computer-readable processor/controller the operation of which is governed by instructions stored in a tangible, non-transitory storage memory. The memory may be random access memory (RAM), read-only memory (ROM), flash memory or any other memory, or combination thereof, suitable for storing control software or other instructions and data. Instruction information may be conveyed to a processor through communication media, including wired or wireless computer networks. In addition, while the invention may be embodied in software, the functions necessary to implement the invention may optionally or alternatively be embodied in part or in whole using firmware and/or hardware components, such as combinatorial logic, Application Specific Integrated Circuits (ASICs), Field-Programmable Gate Arrays (FPGAs) or other hardware or some combination of hardware, software and/or firmware components.

For the purposes of this disclosure and the appended claims, the use of the terms "substantially", "approximately", "about" and similar terms in reference to a descriptor of a value, element, property or characteristic at hand is intended to emphasize that the value, element, property, or characteristic referred to, while not necessarily being exactly as stated, would nevertheless be considered, for practical purposes, as stated by a person of skill in the art. These terms, as applied to a specified characteristic or quality descriptor means "mostly", "mainly", "considerably", "by and large", "essentially", "to great or significant extent", "largely but not necessarily wholly the same" such as to reasonably denote language of approximation and describe the specified characteristic or descriptor so that its scope would be understood by a person of ordinary skill in the art. In one specific case, the terms "approximately", "substantially", and "about", when used in reference to a numerical value, represent a range of plus or minus 20% with respect to the specified value, more preferably plus or minus 10%, even more preferably plus or minus 5%, most preferably plus or minus 2% with respect to the specified value.

The use of these terms in describing a chosen characteristic or concept neither implies nor provides any basis for indefiniteness and for adding a numerical limitation to the specified characteristic or descriptor. As understood by a skilled artisan, the practical deviation of the exact value or characteristic of such value, element, or property from that stated falls and may vary within a numerical range defined by an experimental measurement error that is typical when using a measurement method accepted in the art for such purposes. Other specific examples of the meaning of the terms "substantially", "about", and/or "approximately" as applied to different practical situations may have been provided elsewhere in this disclosure.

References throughout this specification to "one embodiment," "an embodiment," "a related embodiment," or similar language mean that a particular feature, structure, or characteristic described in connection with the referred to "embodiment" is included in at least one embodiment of the present invention. Thus, appearances of the phrases "in one embodiment," "in an embodiment," and similar language throughout this specification may, but do not necessarily, all refer to the same embodiment. It is to be understood that no portion of disclosure, taken on its own and in possible connection with a figure, is intended to provide a complete description of all features of the invention.

Disclosed aspects, or portions of these aspects, may be combined in ways not listed above. Accordingly, the invention should not be viewed as being limited to the disclosed embodiment(s).

The invention claimed is:

1. A system configured to form a container, for holding a live cell, from first and second components and to change operational status of the container, wherein the system includes a holding device comprising:
  upper and lower portions, the lower portion structured to contain a trench, with a first opening throughout a bottom thereof,
  a mechanism removably and repositionably integrated with said upper and lower portions and configured
    to change said operational status by reversibly bringing together and separating from one another the first and second components when said first and second components are disposed between the upper and lower portions, and
    to reversibly sealingly affix said first and second components to one another to form the container with at least one hermetically-sealed chamber present therein, by repositioning the mechanism,
  wherein the mechanism includes a plunger, configured to be moved forward and retracted, with respect to the lower portion, in any of (i) manual, (ii) electromechanical, and (iii) pneumatic fashions, and further includes a three-point wave spring disposed to apply a balanced load to the first component to bring together the first and second components.

2. A system according to claim 1, wherein the holding device defines a fluidic channel when the upper portion and the lower portion are clamped together and the first and second components are disposed between the upper portion and the lower portion, said trench being part of the fluidic channel.

3. A system according to claim 1, wherein the mechanism includes a fluidic pathway therethrough, said fluidic pathway accommodated to apply a force, generated by a suction created outside of the system, to a surface of the mechanism, said surface of the mechanism facing the lower portion during operation of the system.

4. A system according to claim 1, wherein the mechanism is configured to change said operational status by reversibly bringing together and separating from one another the first and second components when said first and second components are disposed between the upper and lower portions in said trench.

* * * * *